(12) United States Patent
Abbaszadeh et al.

(10) Patent No.: US 10,826,932 B2
(45) Date of Patent: Nov. 3, 2020

(54) SITUATION AWARENESS AND DYNAMIC ENSEMBLE FORECASTING OF ABNORMAL BEHAVIOR IN CYBER-PHYSICAL SYSTEM

(71) Applicant: General Electric Company, Schenectady, NY (US)

(72) Inventors: Masoud Abbaszadeh, Clifton Park, NY (US); Lalit Keshav Mestha, North Colonie, NY (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 16/108,742

(22) Filed: Aug. 22, 2018

(65) Prior Publication Data
US 2020/0067969 A1 Feb. 27, 2020

(51) Int. Cl.
*H04L 29/06* (2006.01)
*G06N 7/00* (2006.01)
*G06N 5/04* (2006.01)
*G06K 9/62* (2006.01)
*G06N 20/00* (2019.01)

(52) U.S. Cl.
CPC ........ *H04L 63/1441* (2013.01); *G06K 9/6232* (2013.01); *G06K 9/6261* (2013.01); *G06K 9/6269* (2013.01); *G06K 9/6298* (2013.01); *G06N 5/04* (2013.01); *G06N 7/005* (2013.01); *G06N 20/00* (2019.01); *H04L 63/1425* (2013.01)

(58) Field of Classification Search
CPC .. H04L 63/1441; H04L 63/1425; G06N 7/005
See application file for complete search history.

(56) References Cited

U.S. PATENT DOCUMENTS

| | | | |
|---|---|---|---|
| 8,793,790 B2 | 7/2014 | Khurana et al. | |
| 9,130,983 B2 | 9/2015 | Heo et al. | |
| 9,203,859 B2 * | 12/2015 | Sampigethaya | .... H04L 63/1433 |
| 9,250,625 B2 | 2/2016 | Herzog | |

(Continued)

FOREIGN PATENT DOCUMENTS

CN 102607641 A 7/2012

*Primary Examiner* — Lynn D Feild
*Assistant Examiner* — Viral S Lakhia
(74) *Attorney, Agent, or Firm* — Buckley, Maschoff & Talwalkar LLC

(57) ABSTRACT

A plurality of monitoring nodes may each generate a time-series of current monitoring node values representing current operation of a cyber-physical system. A feature-based forecasting framework may receive the time-series of and generate a set of current feature vectors using feature discovery techniques. The feature behavior for each monitoring node may be characterized in the form of decision boundaries that separate normal and abnormal space based on operating data of the system. A set of ensemble state-space models may be constructed to represent feature evolution in the time-domain, wherein the forecasted outputs from the set of ensemble state-space models comprise anticipated time evolution of features. The framework may then obtain an overall features forecast through dynamic ensemble averaging and compare the overall features forecast to a threshold to generate an estimate associated with at least one feature vector crossing an associated decision boundary.

18 Claims, 26 Drawing Sheets

(56) References Cited

U.S. PATENT DOCUMENTS

| | | | |
|---|---|---|---|
| 9,407,651 B2 | 8/2016 | Mathis | |
| 9,910,980 B2 | 3/2018 | Kolacinski et al. | |
| 10,129,168 B2 * | 11/2018 | Kaminski | H04L 43/0817 |
| 10,204,226 B2 * | 2/2019 | Bushey | G06F 21/57 |
| 10,417,413 B2 * | 9/2019 | Sikder | G06F 21/554 |
| 10,417,528 B2 * | 9/2019 | Ma | G06K 9/6256 |
| 2007/0289013 A1 | 12/2007 | Lim | |
| 2015/0365309 A1 | 12/2015 | Kaminski et al. | |
| 2018/0253569 A1 * | 9/2018 | Swierk | G06F 21/554 |
| 2019/0005237 A1 * | 1/2019 | Long | G06N 3/084 |
| 2019/0258904 A1 * | 8/2019 | Ma | G06K 9/6269 |
| 2019/0334932 A1 * | 10/2019 | Nuqui | H04L 63/20 |

* cited by examiner

_US 10,826,932 B2_

SITUATION AWARENESS AND DYNAMIC ENSEMBLE FORECASTING OF ABNORMAL BEHAVIOR IN CYBER-PHYSICAL SYSTEM

This invention was made with Government support under contract number DE-OE0000833 awarded by the Department of Energy. The Government has certain rights in this invention.

BACKGROUND

Industrial control systems that operate cyber-physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. While progress with machine and equipment automation and protection has been made over the last several decades, and systems have become smarter, the intelligence of any individual cyber-physical system to predict failures (e.g., equipment malfunction, sensor faults, etc.), outages, degradation, a slow drift in performance, and/or cyberthreats in substantially real-time (e.g., to provide an early warning) is a difficult task. Several methods have been proposed for anomaly forecast and prognostic in different industrial control systems. Although technology exists to predict when systems fail, typical approaches used to predict failures are from a Prognostics and Health Management ("PHM") perspective, and therefore are not directly applicable to situation awareness of cyber incidents because they: (1) do not model large-scale transient data incorporating fast system dynamics (i.e., have improper estimation models), and (2) do not to process multiple signals simultaneously to account for anticipated changes in future times in system behavior accurately based on current and past data (i.e., have inaccurate decision thresholds/boundaries). Especially when forecasting a cyber-attack's propagation and impact, the difficulty is further compounded by not knowing an attacker's intention or next move to exploit weaknesses and/or vulnerabilities in the system.

There are many different types of attacks against a cyber-physical system, including espionage attacks, denial of service attacks, deception attacks (e.g., a covert or stealthy attack), zero dynamics attack, false data injection attack, replay attack, and the like, which are just a short sampling of the potential threats that exist. In addition, cyber hackers constantly develop new ways to create malicious code and disrupt the operation of physical system. The present condition monitoring technology used for failure detection, prediction and monitoring or the threat detection technologies included inside Information Technology ("IT") and Operational Technology ("OT") may not adequately provide forecasting to protect assets from these types of attacks. There are many examples in physical systems (e.g., electric grid, ventricular assist devices, etc.) where early warning of only a few seconds may be sufficient to take actions that would protect vulnerable equipment or loss of life.

It would therefore be desirable to protect a cyber-physical system, such as an industrial asset, from abnormalities, such as cyber-attacks and faults, in a fast, automatic, and accurate manner even when attacks percolate through the IT and OT layers and directly harm control systems.

SUMMARY

According to some embodiments, a plurality of monitoring nodes may each generate a time-series of current monitoring node values representing current operation of a cyber-physical system. A feature-based forecasting framework may receive the time-series of and generate a set of current feature vectors using feature discovery techniques. The feature behavior for each monitoring node may be characterized in the form of decision boundaries that separate normal and abnormal space based on operating data of the system. A set of ensemble state-space models may be constructed to represent feature evolution in the time-domain, wherein the forecasted outputs from the set of ensemble state-space models comprise anticipated time evolution of features. The framework may then obtain an overall features forecast through dynamic ensemble averaging and compare the overall features forecast to a threshold to generate an estimate associated with at least one feature vector crossing an associated decision boundary.

Some embodiments comprise: means for receiving, by a feature-based forecasting computer platform from a plurality of monitoring nodes, a time-series of current monitoring node values that represent a current operation of the cyber-physical system; means for generating a set of current feature vectors using feature discovery techniques; means for characterizing the feature behavior for each monitoring node in the form of decision boundaries that separate normal and abnormal space based on operating data of the cyber-physical system; means for constructing a set of ensemble state-space models to represent feature evolution in the time-domain, wherein the forecasted outputs from the set of ensemble state-space models comprise anticipated time evolution of features; means for obtaining an overall features forecast through dynamic ensemble averaging; means for comparing the overall features forecast to a threshold to generate an estimate associated with at least one feature vector crossing an associated decision boundary; and means for transmitting an abnormality alert signal based on the estimate.

Some technical advantages of some embodiments disclosed herein are improved systems and methods to protect one or more cyber-physical systems from abnormalities, such as cyber-attacks and faults, in an automatic and accurate manner.

DETAILED DESCRIPTION

Figure 1:
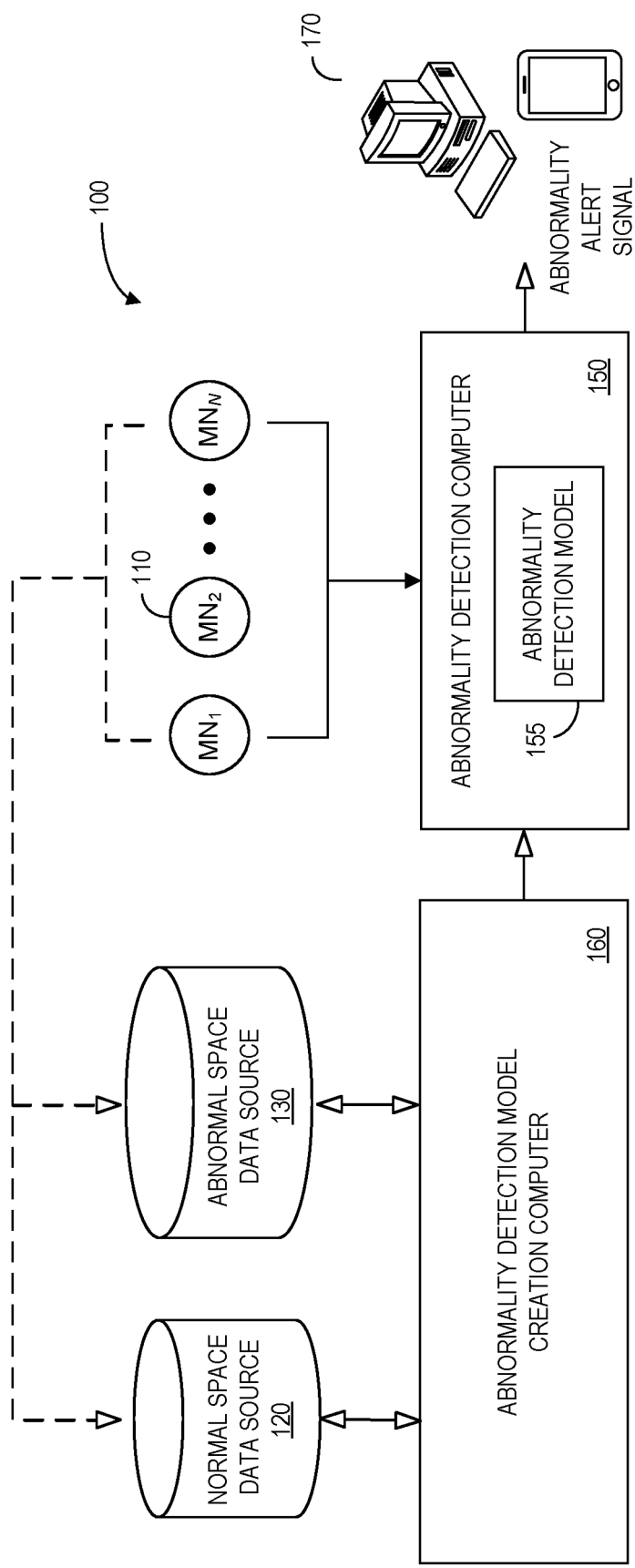
FIG. 1 is a high-level block diagram of a system that may be provided in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Early warning could thwart an attack entirely or help neutralize its effects, such as damage to equipment or sustain the operation. Some embodiments described herein may provide an innovative anomaly forecasting method in order to maintain high levels of reliability and availability while continuing to retain expected performance against abnormalities created by the system faults or a cyber adversary. A forecasting framework may be based on dynamic weighted averaging of multi-model ensemble forecasts. Note that ensemble forecasting has been proven to be very efficient in forecasting complex dynamic phenomena, including wind and other weather conditions and Internet communication traffic. In the context of an industrial control system, some embodiments utilize ensembles to cover plant variations in both operating space and ambient conditions. The ensembles may be selected using a soft cluster method, such as Gaussian Mixture Model ("GMM") clustering, which may provide both centroid (i.e., pre-perceptive operating points) and probability membership functions. A state space model may be developed for each ensemble of each monitoring node, which is used in an adaptive prediction method (e.g., an adaptive multi-step Kalman predictor) to provide ensemble forecast in a receding horizon fashion. Then, the ensemble forecasts are fused via dynamic averaging. Dynamic model averaging has been shown to be superior to other ensemble methods such as Markov Chain Monte Carlo ("MCMC")— especially for large data sets. Embodiments may perform key processing in a high-dimensional feature space by analyzing time-series signals received from multiple system monitoring nodes (a combination of selected control system sensors and actuators) and comparing the forecasted features with anomaly decision boundaries. The decision boundaries may be computed for each individual monitoring node using machine learning techniques. For example, some embodiments utilize Extreme Learning Machine ("ELM") as a binary classification decision boundary. ELM is a special type of flashforward neural network recently developed for fast training. Numerous empirical studies, and recently some analytical studies as well, have shown that ELM has better generalization performance than other machine learning algorithms including Support Vector Machines ("SVM") and is efficient and effective for both classification and regression.

Some embodiments described herein may provide a system and method for reliable cyber-threat detection in an industrial control system or an enterprise asset that contains rapid transients during normal operation. Given a plurality of threat monitoring nodes (e.g., sensor, actuator and controller nodes), a threat detection decision boundary is built in the feature space by incorporating special transient capturing features, augmented to the conventional base features extracted from the time-domain signals of the monitoring nodes. The transient capturing features may be pre-possessed for de-noising and classification decision boundary may be made more robust by anti-jittering. The resulting system may have low real-time computation cost and outperform current threat/anomaly detection methods by having lower false alarm rate during normal rapid transients and faster detection time during cyber incidents.

Some embodiments described herein are associated with time series data from one or more monitoring nodes from a physical (i.e., industrial or enterprise) asset and provides a reliable cyber-threat detection with low false positive rate during rapid operational transitions. Monitoring nodes may include, for example, sensors, actuators, and/or controller nodes. The system may extract features from the time series data for each monitoring node. As used herein, the term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. The features may be computed at the local level (associated with each monitoring node) and/or the global level (associated with all the monitoring nodes, i.e., the whole asset). The time-domain values of the nodes or their extracted features may be, according to some embodiments, normalized for better numerical conditioning.

FIG. 1 is a high-level architecture of a system 100 in accordance with some embodiments. The system 100 may include monitoring node sensors 110 $MN_1$ through $MN_N$, a "normal space" data source 120, and an "abnormal space" data source 130. The normal space data source 120 might store, for each of the plurality of monitoring nodes 110, a series of normal values over time that represent normal operation of a cyber-physical system (e.g., generated by a model or collected from actual sensor data as illustrated by the dashed line in FIG. 1). The abnormal space data source 130 might store, for each of the monitoring nodes 110, a series of abnormal values that represent an abnormal operation of the industrial asset (e.g., when the system is experiencing a cyber-attack or naturally occurring failure).

Information from the normal space data source 110 and the abnormal space data source 120 may be provided to an abnormality detection model creation computer 160 that uses this data to create a decision boundary (that is, a boundary that separates normal behavior from abnormal behavior). The decision boundary may then be used by an abnormality detection computer 150 executing an abnormality detection model 155. The abnormality detection model 155 may, for example, monitor streams of data from the monitoring nodes 110 comprising data from sensor nodes, actuator nodes, and/or any other critical monitoring nodes (e.g., sensor nodes $MN_1$ through $MN_N$) and automatically output an abnormality alert signal to one or more remote monitoring devices 170 when appropriate (e.g., for display to an operator or use by a mitigation process). As used herein, the term "automatically" may refer to, for example, actions that can be performed with little or no human intervention. According to some embodiments, information about detected abnormalities may be transmitted back to an industrial asset control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormality detection model creation computer 160 may store information into and/or retrieve information from various data stores, such as the normal space data source 120 and/or the abnormal space data source 130. The various data sources may be locally stored or reside remote from the abnormality detection model creation computer 160. Although a single abnormality detection model creation computer 160 is shown in FIG. 1, any number of such devices may be included. Moreover, various devices described herein might be combined according to embodiments of the present invention. For example, in some embodiments, the abnormality detection model creation computer 160 and one or more data sources 120, 130 might comprise a single apparatus. The abnormality detection model creation computer 160 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage abnormal operation information in accordance with any of the embodiments described herein. In some cases, an interactive graphical display interface may let a user define and/or adjust certain parameters (e.g., abnormality detection trigger levels) and/or provide or receive automatically generated recommendations or results from the abnormality detection model creation computer 160 and/or abnormality detection computer 150.

Figure 2:
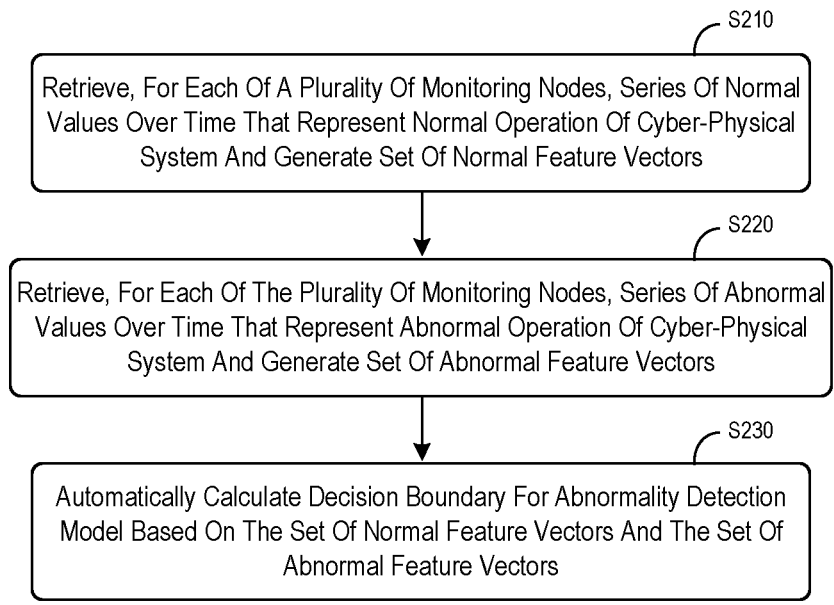
FIG. 2 is a model creation method according to some embodiments.

For example, FIG. 2 illustrates a model creation method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may retrieve, for each of a plurality of monitoring nodes (e.g., sensors, actuators, etc.), a series of normal values over time that represent normal operation of a cyber-physical system and a set of normal feature vectors may be generated. Similarly, at S220 the system may retrieve, for each of the plurality of monitoring nodes, a series of abnormal values over time that represent an abnormal operation of the cyber-physical system (e.g., attacked or fault operation) and a set of abnormal feature vectors may be generated. The series of normal and/or abnormal values might be obtained, for example, by running Design of Experiments ("DoE") on an industrial asset. At S230, a decision boundary may be automatically calculated for an abnormality detection model based on the set of normal feature vectors and the set of abnormal feature vectors. According to some embodiments, the decision boundary might be associated with a line, a hyperplane, a non-linear boundary separating normal space from abnormal space, and/or a plurality of decision boundaries. Moreover, a decision boundary might comprise a multi-class decision boundary separating normal space, attacked space, and degraded operation space (e.g., due to a naturally occurring failure). In addition, note that the abnormality detection model might be associated with the decision boundary, feature mapping functions, and/or feature parameters.

Figure 3:
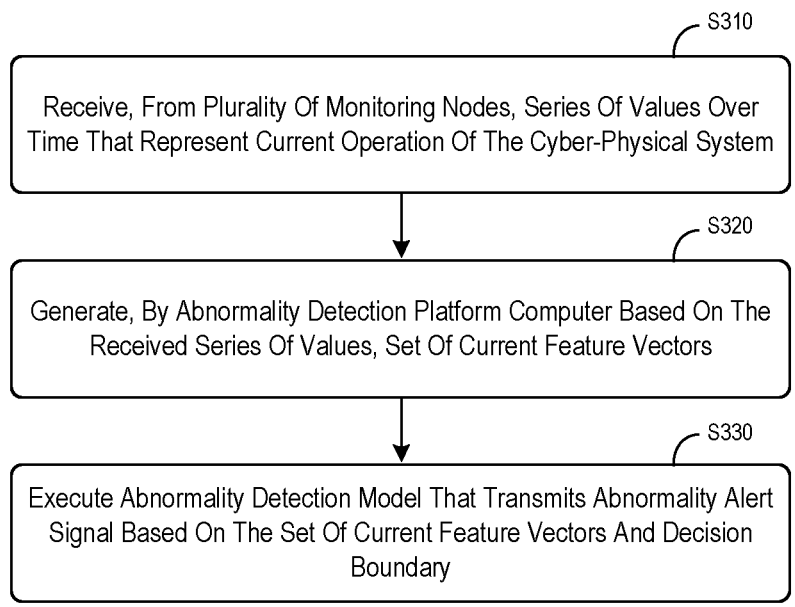
FIG. 3 is an abnormality alert method according to some embodiments.

The decision boundary can then be used to detect abnormal operation (e.g., as a result of a cyber-attack or fault). For example, FIG. 3 is an abnormality alert method according to some embodiments. At S310, the system may receive, from a plurality of monitoring nodes, a series of current values over time that represent a current operation of a cyber-physical system. At S320, an abnormality detection platform computer may then generate, based on the received series of current values, a set of current feature vectors. At S330, an abnormality detection model may be executed to transmit an abnormality alert signal based on the set of current feature vectors and a decision boundary when appropriate (e.g., when a cyber-attack or fault is detected). According to some embodiments, one or more response actions may be performed when an abnormality alert signal is transmitted. For example, the system might automatically shut down all or a portion of an industrial asset (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitoring in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 4:
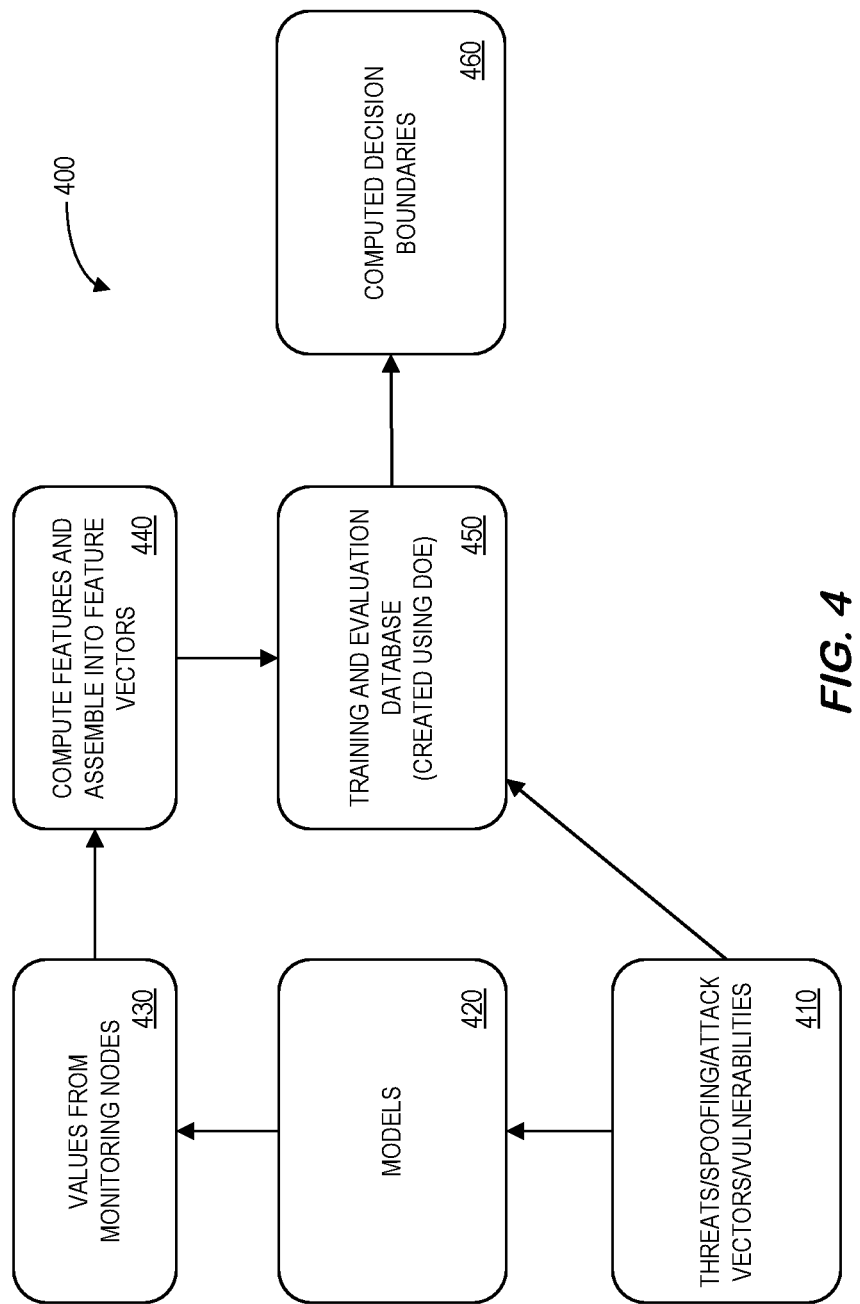
FIG. 4 illustrates an off-line process in accordance with some embodiments.

FIG. 4 illustrates an off-line boundary creation process 400 in accordance with some embodiments. Information about threats, spoofing, attack vectors, vulnerabilities, etc. 410 may be provided to models 420 and/or a training and evaluation database 450 created using DoE techniques. The models 420 may, for example, simulate data from monitoring nodes 430 to be used to compute features that are assembled into a feature vector 440 to be stored in the training and evaluation database 450. The data in the training and evaluation database 450 may then be used to compute decision boundaries 460 to distinguish between normal operation and abnormal operation. According to some embodiments, the process 400 may include a prioritization of monitoring nodes and anticipated abnormal vectors to form one or more data sets to develop decision boundaries. Attack vectors may be associated with abnormal values at critical inputs where malicious attacks can be created at the domain level that will make the system go into threatened/abnormal space. In addition, the models 420 may comprise high-fidelity models that can be used to create a data set (e.g., a set that describes threat space as "levels of threat conditions in the system versus quantities from the threat nodes"). The data 430 from the monitoring nodes might be, for example, quantities that are captured for a length of from 60 to 80 seconds from sensor nodes, actuator nodes, and/or controller nodes (and a similar data set may be obtained for "levels of normal operating conditions in the system versus quantities from the monitoring nodes"). This process will result in data sets for "abnormal space" and "normal space." The 60 to 80 seconds long quantities may be used to compute features 440 using feature engineering to create feature vectors. These feature vectors can then be used to obtain a decision boundary that separates the data sets for threat space and normal space (used to detect an anomaly such as a cyber-attack).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 5:
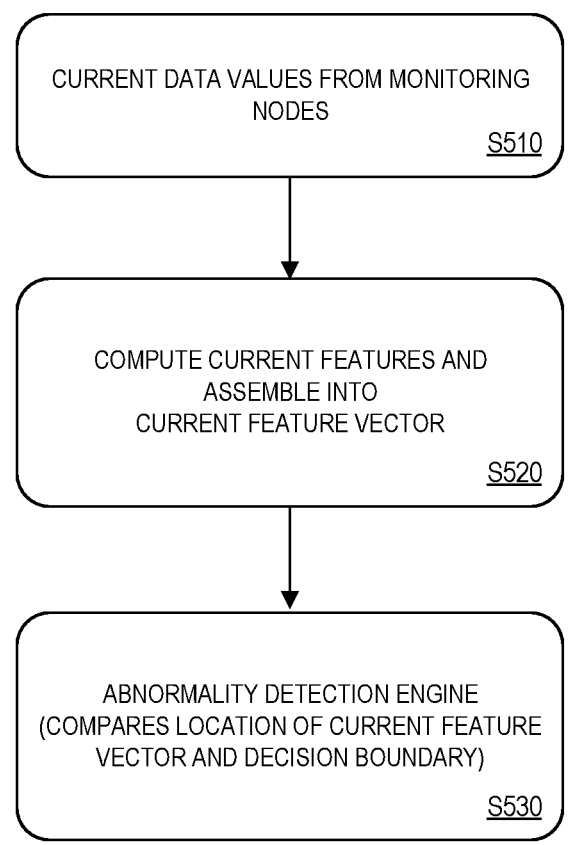
FIG. 5 illustrates a real-time process according to some embodiments.

FIG. 5 illustrates a real-time process to protect a cyber-physical system according to some embodiments. At S510, current data from monitoring nodes may be gathered (e.g., in batches of from 60 to 80 seconds). At S520, the system may compute features and form feature vectors. For example, the system might use weights from a principal component analysis as features. At S530, an abnormality detection engine may compare location of feature vectors to a decision boundary to make a determination (and output an alert signal if necessary). According to some embodiments, monitoring node data from models (or from real systems) may be expressed in terms of features since features are a high-level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple threat nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Figure 6:
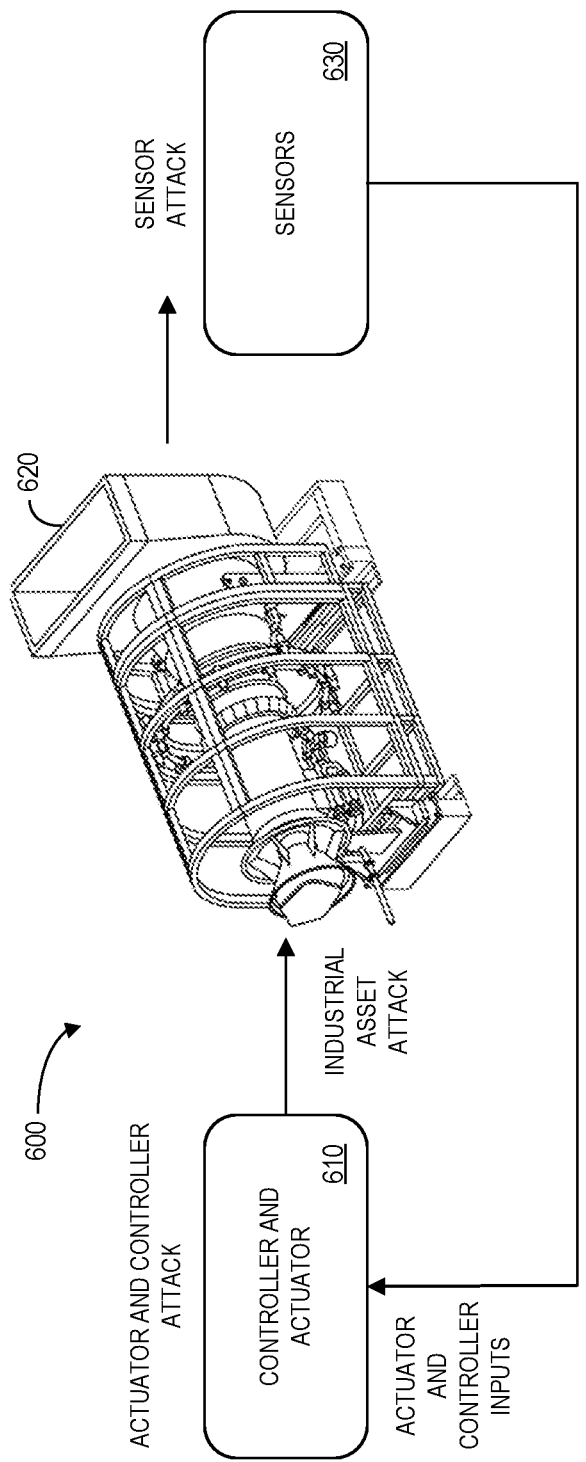
FIG. 6 is an example associated with an industrial asset engine in accordance with some embodiments.

FIG. 6 is an example 600 associated with an industrial asset in accordance with some embodiments. In particular, the example includes a controller and actuator portion 610 subject to actuator and controller attacks, a gas turbine portion 620 subject to state attacks, and sensors 630 subject to sensor attacks. By way of examples only, the sensors 630 might comprise physical and/or virtual sensors associated with temperatures, airflows, power levels, etc. The actuators might be associated with, for example, motors. By monitoring the information in the industrial asset, a threat detection platform may be able to detect cyber-attacks (e.g., using feature vectors and a decision boundary) that could potentially cause a large amount of damage.

Figure 7:
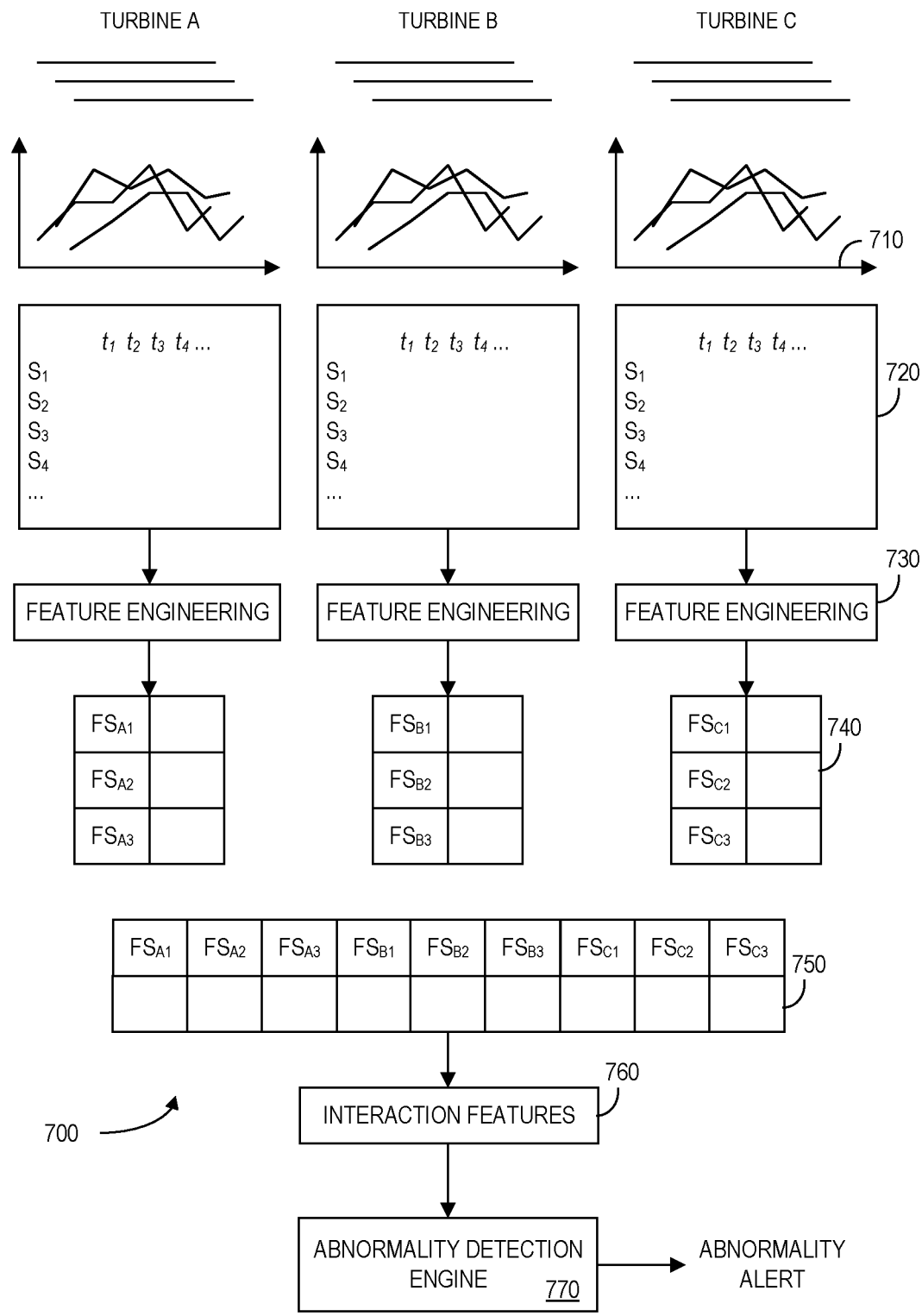
FIG. 7 is an example of a global abnormality protection system in accordance with some embodiments when multiple gas turbines are involved in a system.

FIG. 7 is an example of a global threat protection system 700 in accordance with some embodiments when multiple gas turbines are involved in a system. In particular, the system 700 includes three turbines (A, B, and C) and batches of values 710 from threat nodes are collected for each generated over a period of time (e.g., 60 to 80 seconds). According to some embodiments, the batches of values 710 from threat nodes overlap in time. The values 710 from threat nodes may, for example, be stored in a matrix 720 arranged by time ($t_1$, $t_2$, etc.) and by type of threat node ($S_1$, $S_5$, etc.). Feature engineering components 730 may use information in each matrix 720 to create a feature vector 740 for each of the three turbines (e.g., the feature vector 740 for turbine C might include $FS_{C1}$, $FS_{C2}$, etc.). The three feature vectors 740 may then be combined into a single global feature vector 750 for the system 700. Interaction features 760 may be applied (e.g., associated with A*B*C, A+B+C, etc.) and an abnormality detection engine 770 may compare the result with a decision boundary and output an abnormality alert signal when appropriate.

Figure 8:
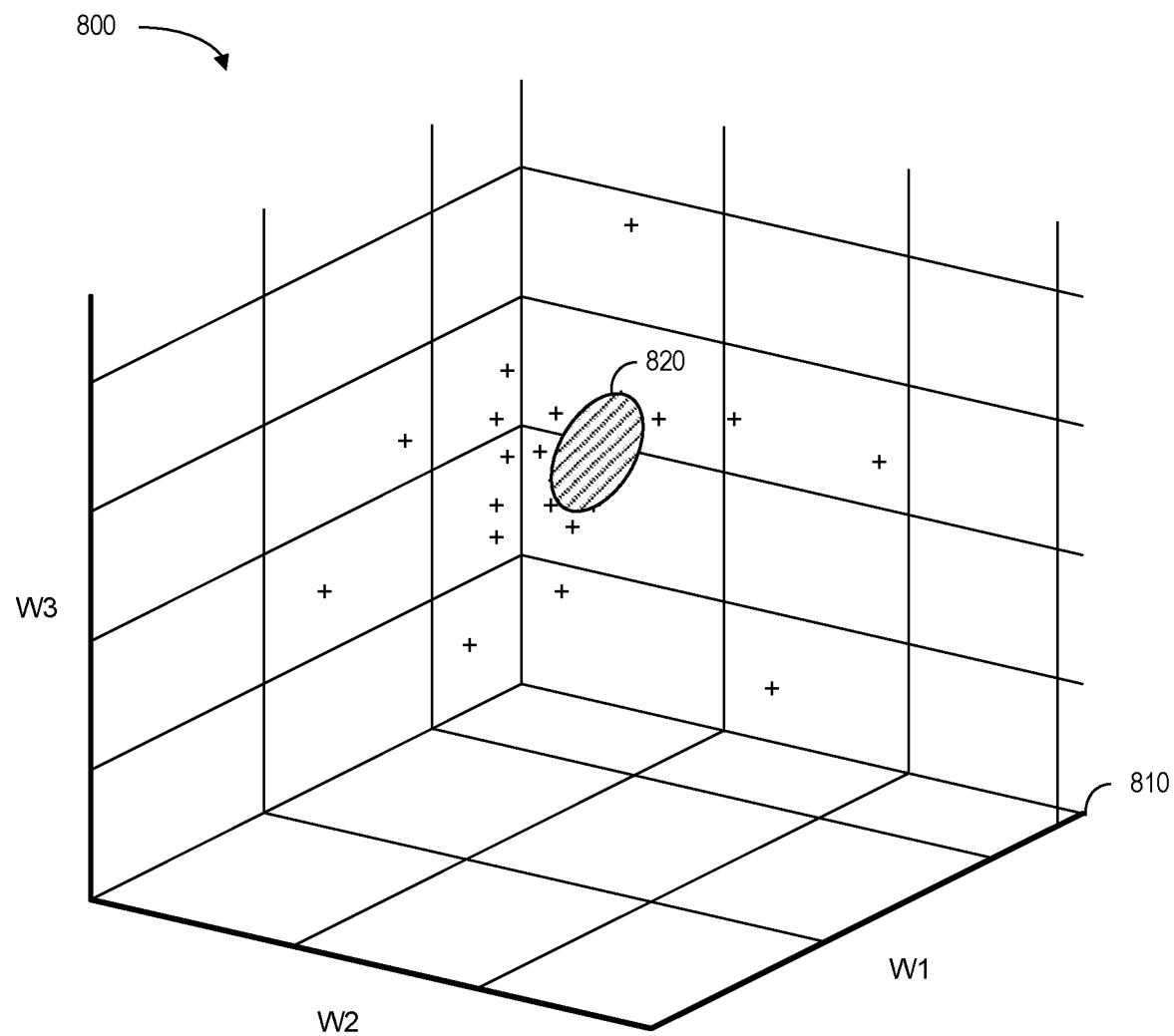
FIG. 8 illustrates three dimensions of sensor outputs in accordance with some embodiments.

FIG. 8 illustrates 800 three dimensions of monitoring node outputs in accordance with some embodiments. In particular, a graph 810 plots monitoring node outputs ("+") in three dimensions, such as dimensions associated with Principal Component Features ("PCF"): w1, w2, and w3. Moreover, the graph 810 includes an indication of a normal operating space decision boundary 820. Although a single contiguous boundary 820 is illustrated in FIG. 8, embodiments might be associated with multiple regions. Note that PCF information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a threat node quantity at "k" instant of time. Moreover, output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\psi_j$ is the $j^{th}$ basis vector. According to some embodiments, natural basis vectors are obtained using a covariance of the threat nodes' data matrix. Once the basis vectors are known, weight may be found using the following equation (assuming that the basis sets are orthogonal):

$$w_j = (S - S_0)^T \psi_j$$

Note that weights may be an example of features used in a feature vector.

Thus, embodiments may enable the passive detection of indications of multi-class abnormal operations using real-time signals from monitoring nodes. Moreover, the detection framework may allow for the development of tools that facilitate proliferation of the invention to various systems (e.g., turbines) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to industrial asset operators so that an attack may be thwarted (or the effects of the attack may be blunted), reducing damage to equipment.

According to some embodiments, a system may further localize an origin of a threat or fault to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in an abnormality alert signal.

Some embodiments may utilize feature-based learning techniques based on high-fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

Figure 9:
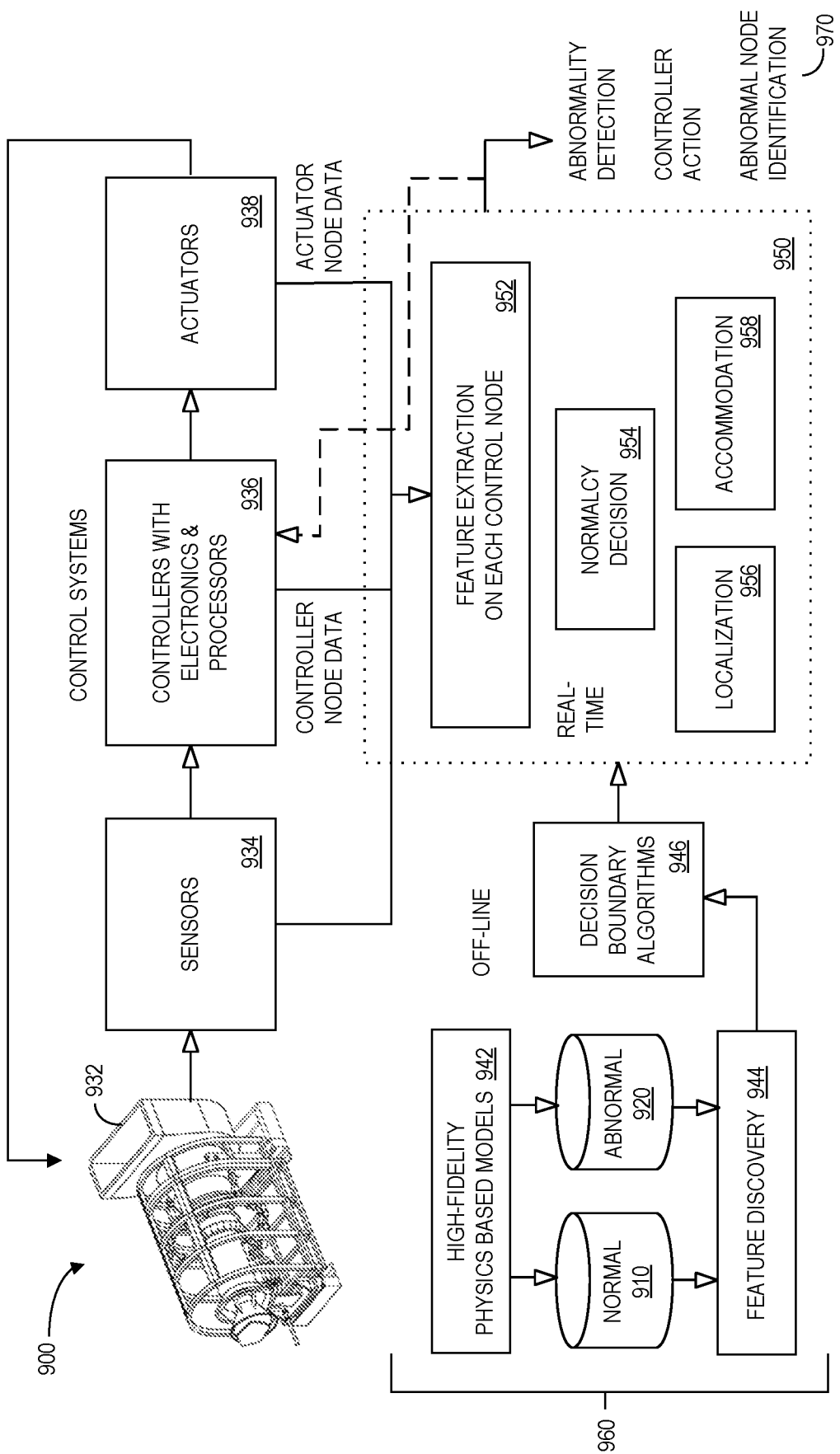
FIG. 9 is an abnormality alert system according to some embodiments.

A cyber-abnormality detection and localization algorithm may process a real-time industrial asset signal data stream and then compute features (multiple identifiers) which can then be compared to the signal-specific decision boundary. A block diagram of a system 900 utilizing a signal-specific industrial asset cyber-abnormality detection and localization algorithm according to some embodiments is provided in FIG. 9. In particular, a gas turbine 932 provides information to sensors 934 which helps controllers with electronics and processors 936 adjust actuators 938. An abnormality detection system 960 may include one or more high-fidelity physics-based models 942 associated with the turbine 932 to create normal data 910 and/or abnormal data 920. The normal data 910 and abnormal data 920 may be accessed by a feature discovery component 944 and processed by decision boundary algorithms 946 while off-line (e.g., not necessarily while the gas turbine 932 is operating). The decision boundary algorithms 946 may generate an abnormality model including decision boundaries for various monitoring nodes. Each decision boundary may separate two data sets in a high dimensional space which is constructed by running a binary classification algorithm, such as a support vector machine using the normal data 910 and abnormal data 920 for each monitoring node signal (e.g., from the sensors 934, controllers 936, and/or the actuators 938).

A real-time abnormality detection platform 950 may receive the boundaries along with streams of data from the monitoring nodes. The platform 950 may include a feature extraction on each monitoring node element 952 and a normalcy decision 954 with an algorithm to detect attacks or faults in individual signals using signal specific decision boundaries, as well rationalize attacks and/or faults on multiple signals, to declare which signals were abnormal, and which became anomalous due to a previous attack on or fault in the system via a localization module 956. An accommodation element 958 may generate outputs 970, such as an abnormality decision indication (e.g., an abnormality alert signal), a controller action, and/or a list of abnormal monitoring nodes.

During real-time detection, contiguous batches of control signal data may be processed by the platform 950, normalized and the feature vector extracted. The location of the vector for each signal in high-dimensional feature space may then be compared to a corresponding decision boundary. If it falls within the abnormal region, then a cyber-attack or fault may be declared. The algorithm may then make a decision about where the attack or fault originally occurred. For example, an attack may sometimes be on the actuators 938 and then manifested in the sensor 934 data. Abnormality assessments might be performed in a post decision module (e.g., the localization element 956) to isolate whether the attack or fault is related to the sensor, controller, or actuator (e.g., indicating which part of the monitoring node). This may be done by individually monitoring, overtime, the location of the feature vector with respect to the hard decision boundary. For example, when a sensor 934 is spoofed, the attacked sensor feature vector will cross the hard decision boundary earlier than the rest of the vectors as described with respect to FIGS. 10 through 12. If a sensor 934 is declared to be anomalous, and a command to the auxiliary equipment is later determined to be anomalous, it may be determined that the original attack, such as signal spoofing, occurred on the sensor 934. Conversely, if the signal to the auxiliary equipment was determined to be anomalous first, and then later manifested in the sensor 934 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 10:
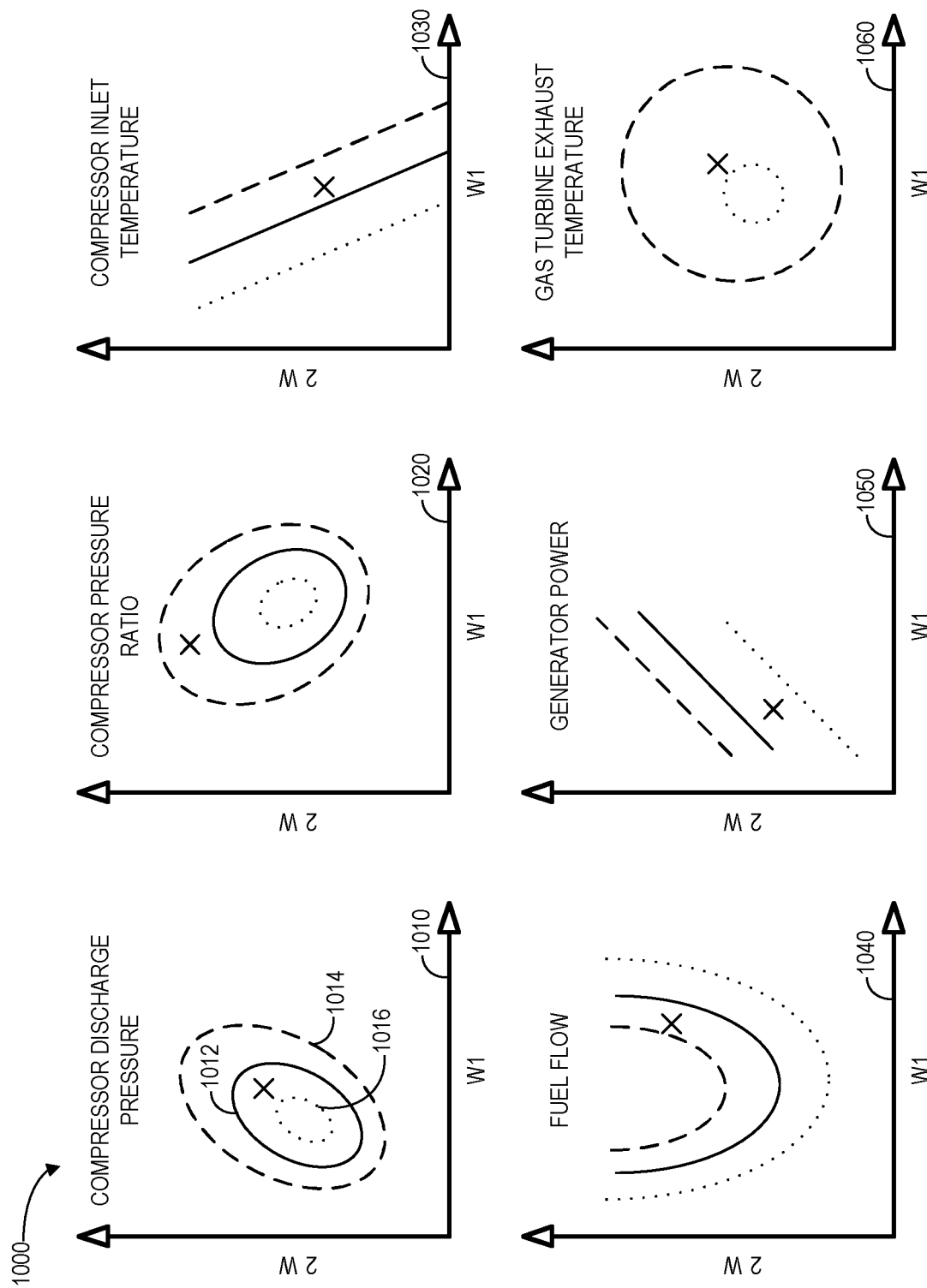
FIGS. 10 through 12 illustrate boundaries and locations of feature vectors for various parameters in accordance with some embodiments.

FIG. 10 illustrates 1000 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data but note that other features could be leveraged.

A graph is provided for compressor discharge temperature 1010, compressor pressure ratio 1020, compressor inlet temperature 1030, fuel flow 1040, generator power 1050, and gas turbine exhaust temperature 1060. Each graph includes a hard boundary 1012 (solid curve), minimum boundary 1016 (dotted curve), and maximum boundary 1014 (dashed curve) and an indication associated with current feature location for each monitoring node parameter (illustrated with an "X" on the graph). As illustrated in FIG. 10, the current monitoring node location is between the minimum and maximum boundaries (that is, the "X" is between the dotted and dashed lines). As a result, the system may determine that the operation of the industrial asset control system is normal (and nothing indicates that the system is currently under attack or experiencing a failure).

Figure 11:
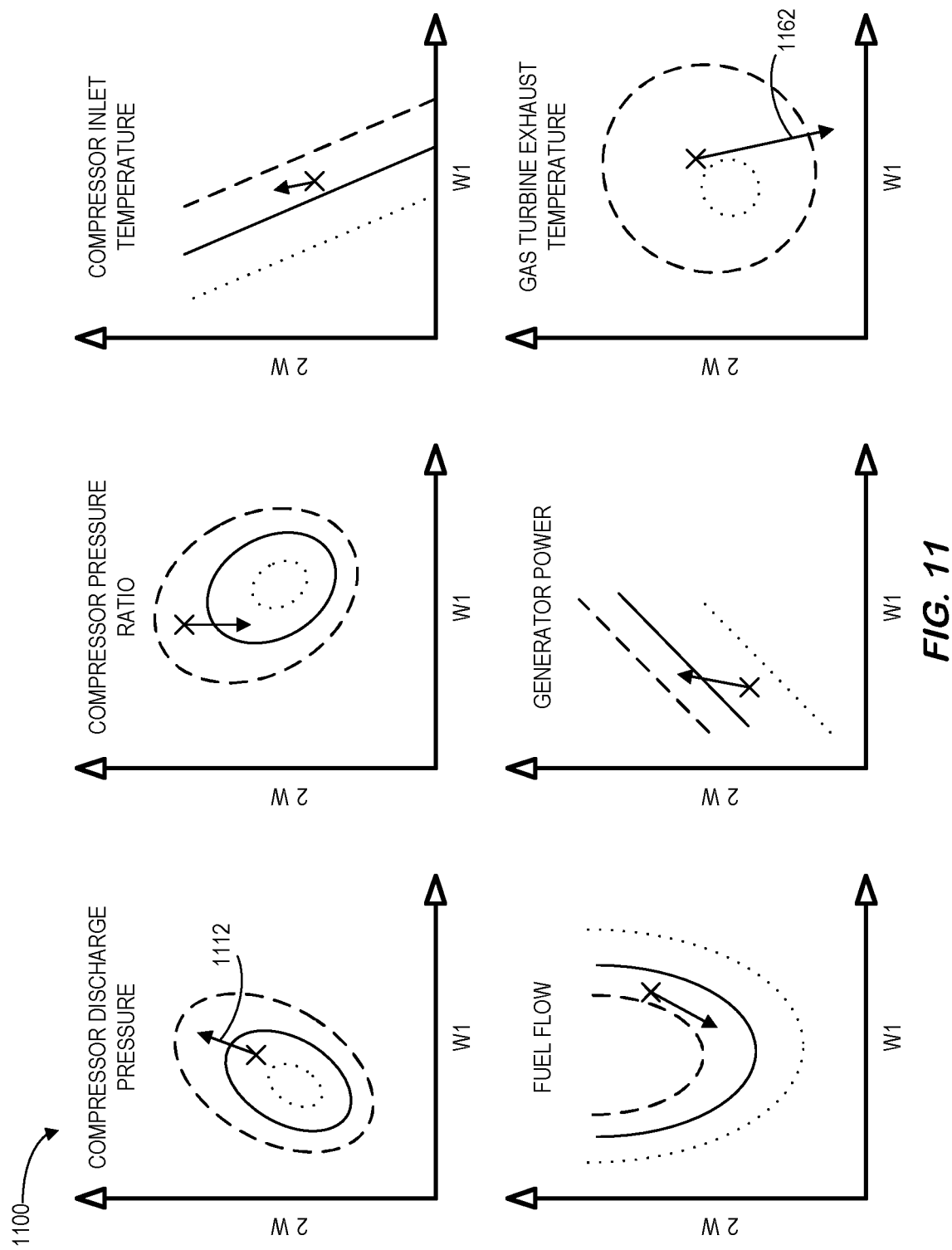

FIG. 11 illustrates 1100 subsequent boundaries and feature vectors for these parameters. Consider, for example, a feature vector movement 1112 for the compressor discharge pressure. Even though feature vector 1112 has moved, it is still within the maximum and minimum boundaries and, as a result, normal operation of that monitoring node may be determined. This is the case for the first five graphs in FIG. 11. In this example, a feature vector movement 1162 for the gas turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary monitoring node signal feature vector illustrated in FIG. 11 moves 1162 such that it is anomalous. The algorithm detects the abnormality, and two parallel actions might be initiated. One action may be post processing of the signal to discover what was attacked or experiencing a failure, in this case if the system has been monitoring each exhaust thermocouple, it may conclude that none of them are currently abnormal. Therefore, it may be determined that something used to calculate this feature was attacked or broken. The other action may be to continually monitor and detect additional attacks or failures. Such an approach may facilitate a detection of multiple signal attacks.

Given the example of FIG. 11, assume that the gas turbine exhaust temperature signal was attacked. This may cause the system to respond in such a way so as to put other signals into an abnormal state. This is illustrated 1200 in FIG. 12, where the attack has already been detected and now other signals shown to be abnormal. In particular, feature movement for the compressor discharge pressure 1212, compressor pressure ratio 1222, compressor inlet temperature 1232, and fuel flow 1242 have all become abnormal (joining the feature vector for the gas turbine exhaust temperature 1262). Note that the feature vector for generator power did not become abnormal. In order to decide whether or not these signals 1212, 1222, 1232, 1242 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements may be analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to Fault Detection Isolation and Accommodation ("FDIA"), which itself is very limited. The cyber-abnormality detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., temperature, airflow, etc.). Full factorial, Taguchi screening, central composite and Box-Behnken are some of the known design methodologies used to create the attack space. When models are not available, these DoE methods are also used to collect data from real-world industrial assets. Experiments may be run at different combinations of simultaneous attacks. In some embodiments, the system may detect degraded/faulty operation as opposed to a cyber-attack. Such decisions might utilze a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 12:
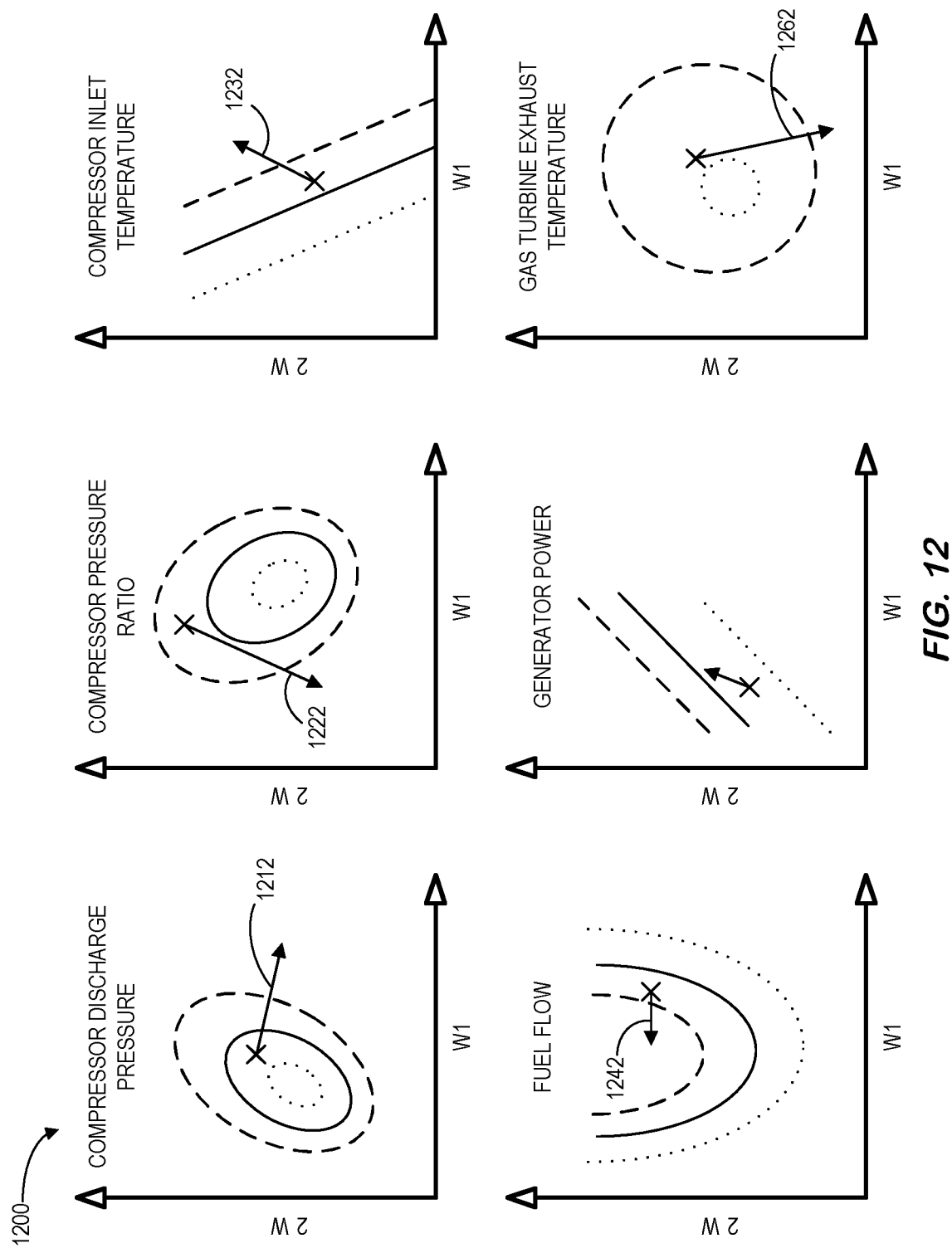

Note that multiple vector properties might be examined, and the information described with respect to FIGS. 10 through 12 may be processed to determine if the signal had been trending in a specific direction as the attack was detected (or if it had just been moving due to noise). Had the signal been uniformly trending as the attack took place and afterward, then this signal is a response to the original attack and not an independent attack.

According to some embodiments, the system may localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

A cyber-abnormality detection and localization algorithm may process a real-time industrial asset signal data stream and then compute features (multiple identifiers) which can then be compared to the sensor specific decision boundary. In some embodiments, generating features may involve simply performing an identity transform. That is, the original signal might be used as it is.

According to some embodiments, an anomaly forecaster may receive signals that have been sensed from or about a cyber-physical system such as a gas turbine, a wind turbine, a locomotive, an aircraft, a healthcare machine, an industrial manufacturing machine, drilling machinery/equipment, mining machinery/equipment, and the like. The anomaly forecaster may receive at least one input signal that includes time series data or an input signal that has been converted from the time domain into the frequency domain (i.e., frequency space). The time series data may include measurements or other readings captured at various time intervals. Examples of time series data include speed, intensity, acceleration, weight, force, thrust, and the like. The time series data may be transformed into the feature domain by the anomaly forecaster if it is not already in the frequency domain.

As an example, the anomaly forecaster may be included in a general system such as a cyber-physical system, a software system, a bio-mechanical system, a network system, a communication system, and/or the like, which contains access to a continuous stream of data in the form of time series signals or other types of data signals. The signals may be generated from data sensed by monitoring nodes such as sensor nodes (e.g., physical and/or virtual sensors), actuator nodes (e.g., hard and/or soft actuators generated from open or closed loop system), controller nodes (e.g., controller node signals), reference nodes (e.g., reference signals), and the like. In some examples, logical signals may also be considered. A total number of signals that may be used for providing immunity to a system may be equal to a total number of nodes that exist in sensors, actuators, controllers and reference nodes, or it may be more or less number of nodes. Some or all combinations of these nodes can be used for monitoring, anomaly forecasting, threat warning, and neutralization.

Figure 13:
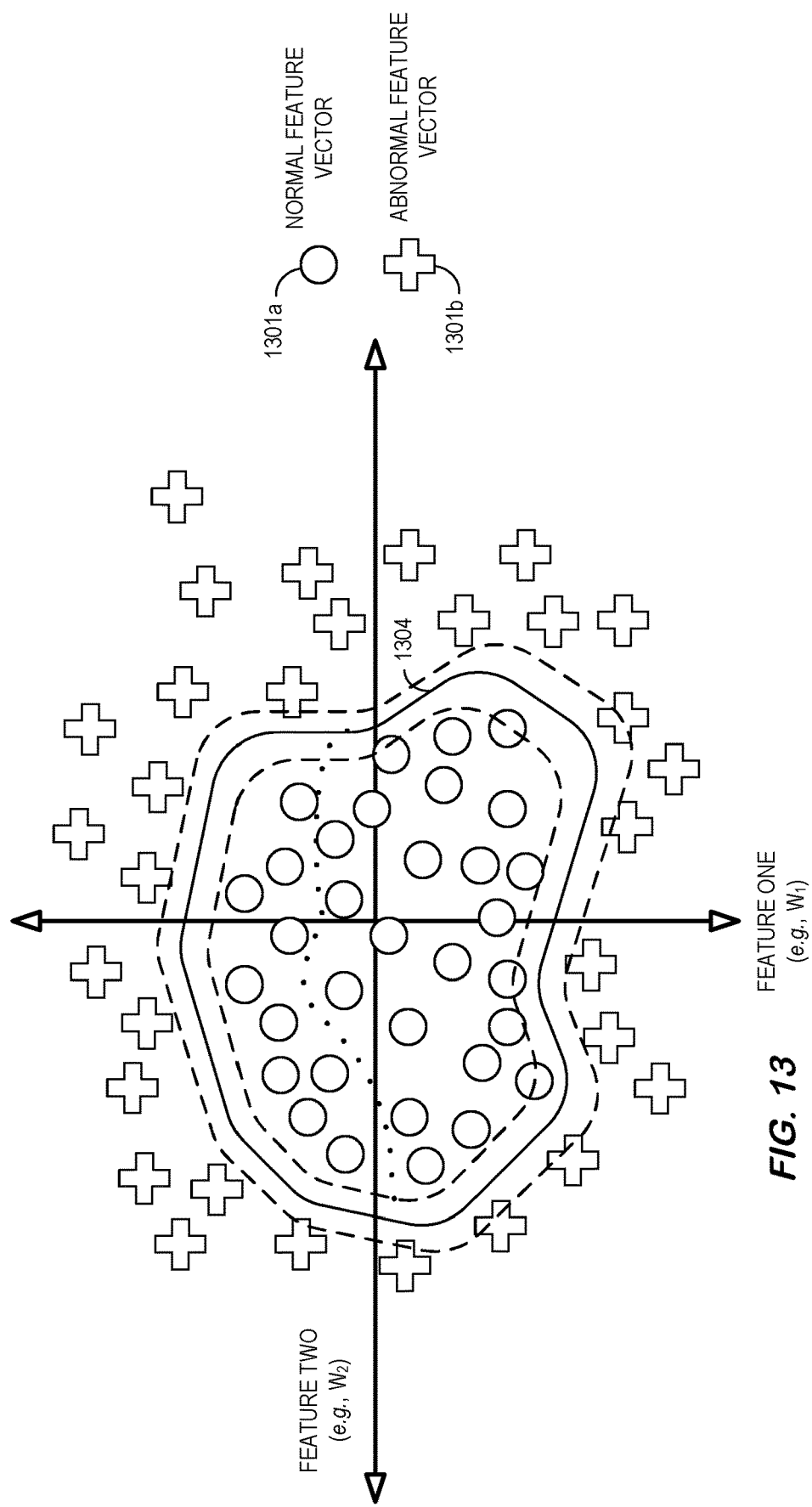
FIG. 13 is a diagram illustrating a boundary for use in anomaly forecasting in a feature space in accordance with an example embodiment.

FIG. 13 illustrates a graph 1300 of a feature boundary for use in anomaly forecasting in a feature space in accordance with an example embodiment. As described herein, a feature as applied to data might include a maximum, a minimum, a mean, a standard deviation, a variance, a range, a current value, a settling time, FFT spectral components, linear and non-linear principal components, independent components, sparse coding features, deep learning features, and the like. In the example of FIG. 13, the normal performance of the system (e.g., asset, node, etc.) is shown graphically as a performance constraint 1302 represented by a dotted curved line. The performance constraint 1302 is within an inner region of a decision boundary 1304 (also referred to as a normal operating region). The inner region represents historically normal feature values 1301*a* (e.g., feature vectors) for a node. Meanwhile, an outer region of the decision boundary 1304 (also referred to as abnormal operation region) represents abnormal feature values which are potentially threats/anomalies within the system. In some cases, the decision boundary 1304 may be a hard boundary or it may be a soft boundary and include inner and outer margins 1306 and 1308. However, embodiments are not limited thereto.

For a given scenario, time series signals (e.g., ~45 seconds) may be captured and pre-processed. These signals may be processed by feature extraction algorithms (e.g., PCA) to reduce the dimensionality or order of the system. For example, time series data from monitoring sensor nodes may be converted into feature vectors in feature space. The procedure may be the same for all other signals. When principal components are used as features, weights become the features in reduced dimensions within the feature space. In the pre-processing step, temporal normalization of node data may be performed. As an example, when principal components are used as features, the normalized output may be expressed as a weighted linear combination of base functions.

Under normal operation, features may be extracted from overlapping batches of time series data. The process may be continued over each overlapping batch resulting in a new time series of feature evolution in the feature space. Then, the feature time series may be used for performing system identification (i.e., dynamic modeling) to model the time evolution of features. A selected subset of the features may be used for dynamic modeling using state space system identification methods. The dynamic models may be in state space format. The dynamic modeler may use a multivariate Vector Auto-Regressive ("VAR") model or regression models for fitting dynamic models into feature time series data at different time scales. If this approach is not adequate, another model may be used such as a tuned feature-based digital twin model, a Time-Varying Parameter ("TVP") VAR model computed from feature evolution data or a priori distribution to obtain various matrices representing state space form (i.e., system matrix, control matrix, output matrix and feedforward matrix). A Boundary and Performance Resilient Estimator ("BPRE") may compute a threat/attack boundary (e.g., decision boundary 1304) and, also compute a performance constrained resilient estimator from the normal data values received historically from the asset. The decision boundary may be computed using classification-based machine learning methods such as SVM or an Artificial Neural Network ("ANN").

In FIG. 13, the feature values 1301a positioned inside the decision boundary 1304 are considered normal feature values 1301a and are not considered to present threats while the feature values 1301b positioned outside the decision boundary 1304 are considered abnormal feature values 1301b. The abnormal feature values 1301b outside the decision boundary 1304 may be due to cyber-attacks or natural faults/failures. In some cases, a cyber-attack or other threat may cause a previously normal feature vectors that is positioned within the normal operating region of the decision boundary 1304 to a position that is outside of the decision boundary 1304 or the abnormal operating region designated by attack points 1301b.

According to various embodiments, when a normal feature value 1301a within the normal region begins to move towards the decision boundary 1304 it may indicate that the asset or the node is about to be or is currently undergoing an attack. The anomaly forecaster provided herein may identify normal feature values 1301a within the normal operating region that are moving towards the decision boundary 1304 and predict if and when an upcoming or future signal of the presently normal feature value will cross over the decision boundary 1304 and become an abnormal feature value 1301b. Rather than wait until the feature value has crossed into the threat region and become an abnormal feature value 1301b, the anomaly forecaster may predict that the feature value is going to cross into the abnormal operating region and output an early warning signal, for example, to a control system, an operator, a threat neutralizer, and the like, which can compensate for the attack by making adjustments in the system, employing a threat neutralizer, powering down, and the like.

Figure 14:
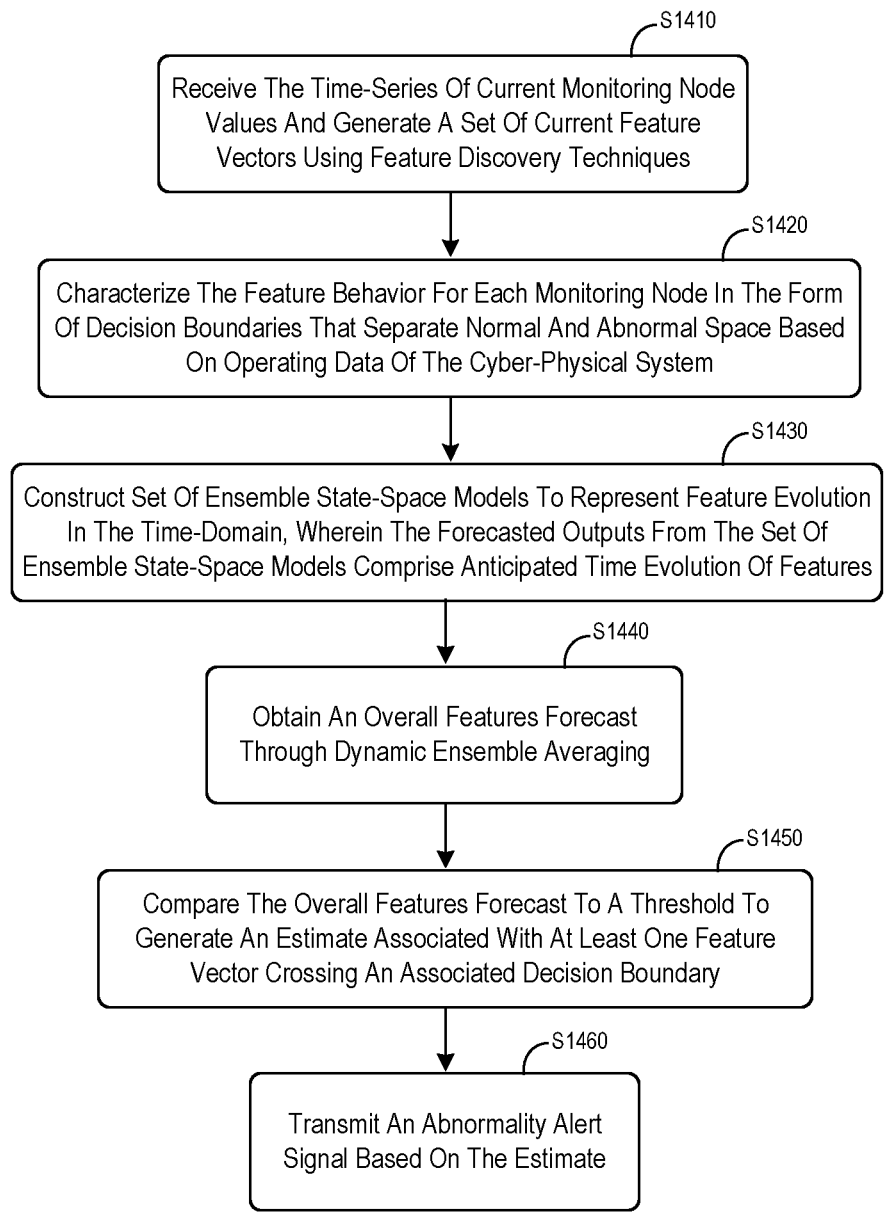
FIG. 14 is an abnormality detection method in accordance with some embodiments.

FIG. 14 is an abnormality detection method in accordance with some embodiments. At S1410, a feature-based forecasting framework may receive, from a plurality of monitoring nodes, a time-series of current monitoring node values that represent a current operation of a cyber-physical system. The framework may then generate a set of current feature vectors using feature discovery techniques. Note that the generation of the set of current feature vectors might uses dimensionality reduction in the feature space. Moreover, the set of current feature vectors may include include local feature vectors and/or global feature vectors.

At S1420, the system may characterize the feature behavior for each monitoring node in the form of decision boundaries that separate normal and abnormal space based on operating data of the cyber-physical system. The operating data might be collected from, for example, operation of the cyber-physical system and/or execution of a virtual model of the cyber-physical system.

At S1430, a set of ensemble state-space models may be constructed to represent feature evolution in the time-domain, wherein the forecasted outputs from the set of ensemble state-space models comprise anticipated time evolution of features. Note that the ensembles might be constructed via selections that use Gaussian Mixture Model ("GMM") clustering. Moreover, the construction of the set of ensemble state-space models may use model order reduction in the dynamic state-space. According to some embodiments, the forecasted outputs are computed by applying an adaptive Kalman predictor to each ensemble model.

At S1440, an overall features forecast may be obtained through dynamic ensemble averaging. For example, the dynamic ensemble averaging might include projecting the evolution of feature vector to future times in a receding horizon fashion. At S1450, the system may compare the overall features forecast to a threshold to generate an estimate associated with at least one feature vector crossing an associated decision boundary. For example, the estimate might include an indication of whether at least one feature vector is predicted to cross an associated decision boundary. According to some embodiments, the estimate includes an indication of when at least one feature vector is predicted to cross an associated decision boundary. At S1460, the system may transmit an abnormality alert signal based on the estimate. Note that the abnormality alert signal could be associated a failure in the cyber-physical system and/or a cyber-attack.

Thus, a scalable and effective solution may be provided for the large-scale dynamic prediction of abnormalities within systems having a substantial number of nodes and extracted features both at the local and global (i.e., system) levels. Some embodiments utilize dimensionality reduction in the feature space, model order reduction in the dynamic state space, and anomaly score prediction. A feature-based forecasting framework may provide rapid detection and early warning of abnormalities in cyber-physical systems. Note that abnormalities may refer to intelligent cyber-attacks or naturally occurring faults and failures. Techniques described herein may protect against unauthorized intrusions as well as fault prevention. Time series signals from system monitoring nodes may, in some embodiments, be converted to features using feature discovery techniques. The feature behavior for each monitoring node may be characterized in the form of decision boundaries (separating normal and abnormal space with operating data collected from the plant or by running virtual models of the plant). A set of ensemble state-space models may be constructed to represent feature evolution in the time-domain, and the ensembles may be selected using GMM clustering. The forecasted outputs may be an anticipated time evolution of features, computed by applying an adaptive Kalman predictor to each ensemble model. The overall features forecast may then be obtained through dynamic ensemble averaging. This might be done, for example, by projecting the evolution of feature vector to future times in a receding horizon fashion. The features forecast can be compared to the decision boundary to estimate if/when the feature vectors will cross the boundary. Simulation results in a high-fidelity gas turbine platform show the effectiveness of this approach for forecasting abnormalities, which can be used for protecting physical assets from abnormalities due to cyber intrusion or natural faults.

Figure 15:
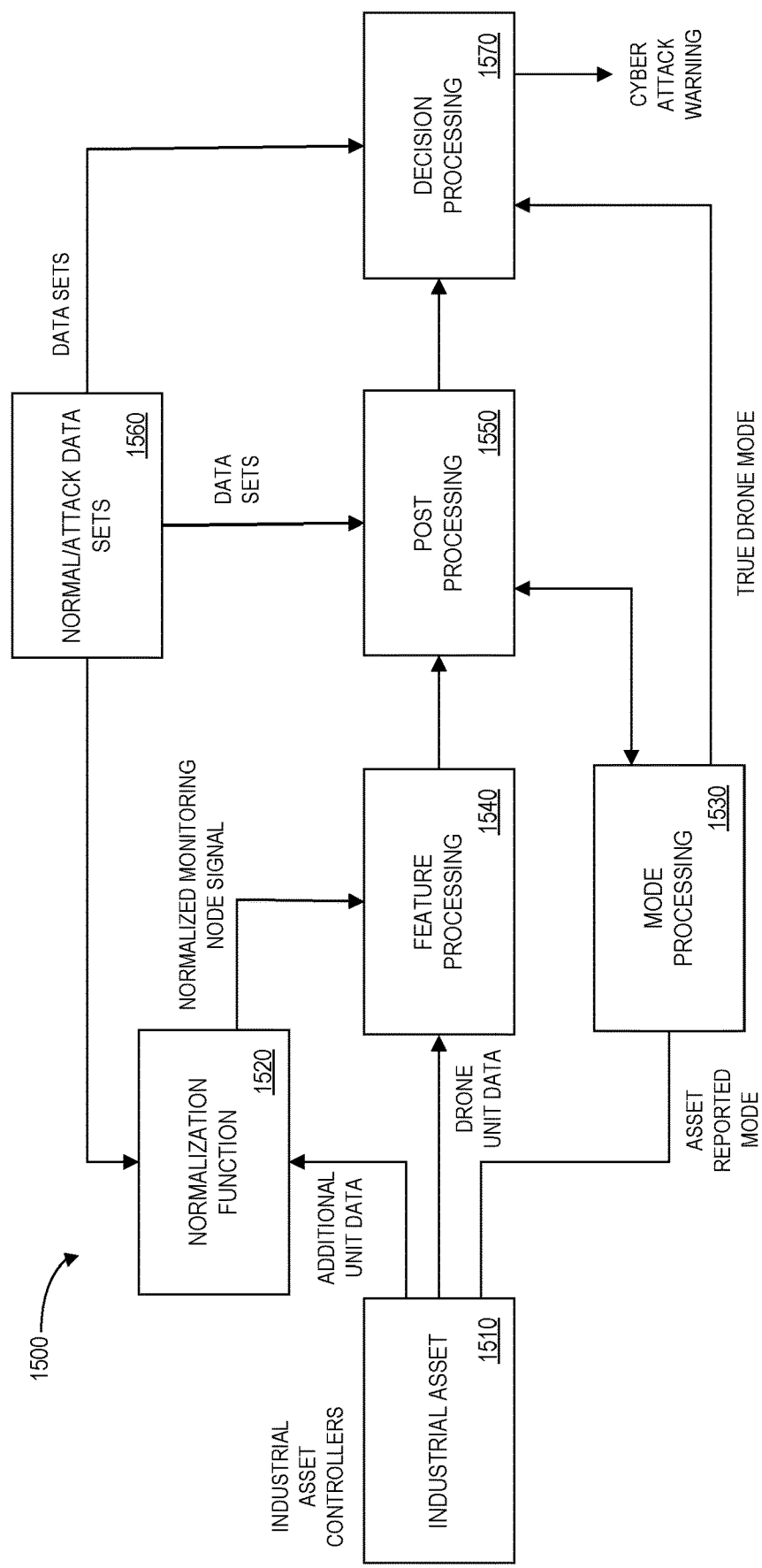
FIG. 15 illustrates a block diagram view of a cyber-abnormality detection system in accordance with some embodiments.

According to some embodiments, an industrial asset may be associated with non-linear operations over a range of operating parameters. As a result, data variations can be substantial and determining when a cyber threat is present based on operation of the control system may be difficult. FIG. 15 illustrates a block diagram view of a cyber-abnormality detection system 1500 in accordance with some embodiments. In particular, the system 1500 illustrates an industrial asset 1510 (e.g., associated with unit controllers) that transmits information about temperature, airflow, etc. to a normalization function 1520. The industrial asset 1510 may also transmit information, to mode processing 1530 (e.g., a reported mode of operation) and feature processing 1540 (e.g., unit data). The normalization function 1520 might, for example, transmit a normalized monitoring node signal to feature processing 1540. Post processing 1550 may receive information from feature processing 1540 and transmit data to decision processing 1570 (which can automatically create a cyber-attack warning based at least in part on data sets received from a normal/attack data sets storage unit 1560).

Figure 16:
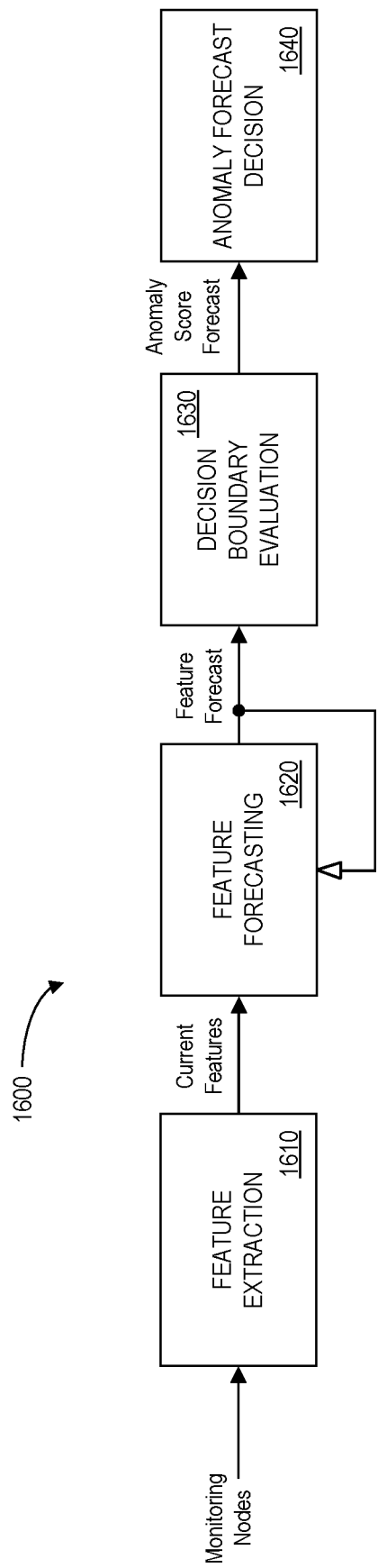
FIG. 16 is a feature forecast framework for anomaly prediction according to some embodiments.

The cyber-abnormality detection system 1500 may utilize a forecasting framework to predict when a feature is going to move into abnormal space in accordance with any of the embodiments described herein. The arrangement of the forecasting framework may, depending on the scale of the system and outcome of the dimensionality reduction, forecast either the features or an anomaly score. FIG. 16 is a high-level system 1600 view of a "feature" forecasting framework to predict anomalies according to some embodiments. In particular, the system 1600 receives data from monitoring nodes and performs feature extraction 1610 to determine current features. The current features are used by feature forecasting 1620 to create a feature forecast that is provided for decision boundary evaluation 1630. The decision boundary evaluation 1630 generates an anomaly score forecast that results in an anomaly forecast decision 1640. In this approach, the feature forecast is fed back into the feature forecasting 1620 to improve operation of the system 1600.

Figure 17:
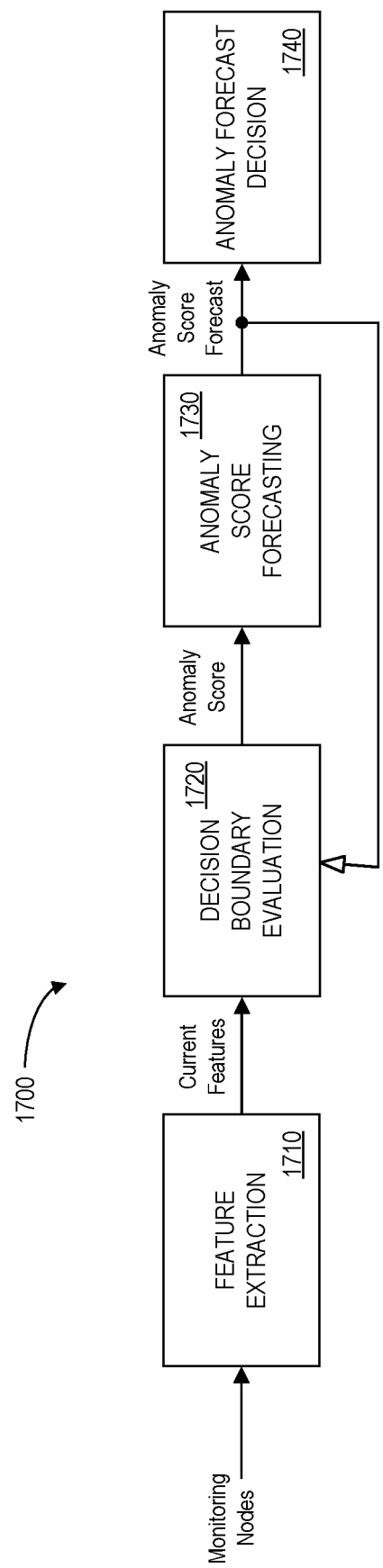
FIG. 17 is anomaly score forecasting framework for anomaly prediction in accordance with some embodiments.

FIG. 17 is a high-level system 1700 view of an "anomaly score" forecasting framework to predict anomalies according to some embodiments. As before, the system 1700 receives data from monitoring nodes and performs feature extraction 1710 to determine current features. The current features are used by decision boundary evaluation 1720 to generate an anomaly score that is provided to anomaly score forecasting 1730. The anomaly score forecasting 1730 uses that information to generate an anomaly score forecast that results in an anomaly forecast decision 1740. In this approach, the anomaly score forecast is fed back into the decision boundary evaluation 1720 to improve operation of the system 1700.

Note that the sensing approaches described herein may be able handle many different types of inputs from multiple heterogeneous data stream in complex hyper connected systems. Signals from time domain may be converted to features using a Multi-Modal-Multi-Disciplinary ("MMMD") feature discovery framework employed as in machine learning discipline. A "feature" may refer to, for example, mathematical characterizations of data and is computed in each overlapping batch of data stream. Examples of features as applied to sensor data can be classified broadly into knowledge-based, shallow, and deep features.

"Knowledge" based features use domain or engineering knowledge of physics of the system to create features. These features can be simply statistical descriptors (e.g., max, min, mean, variance), and different orders of statistical moments, calculated over a window of a time-series signal and its corresponding FFT spectrum as well. "Shallow" features are from unsupervised learning (e.g., k-means clustering), manifold learning and nonlinear embedding (e.g., isoMap, locally-linear embedding), low dimension projection (e.g., principal component analysis, independent component analysis), and neural networks, along with genetic programming and sparse coding. "Deep" learning features can be generated using deep learning algorithms which involve learning good representations of data through multiple levels of abstraction. By hierarchically learning features layer-by-layer, with higher-level features representing more abstract aspects of the data, deep learning can discover sophisticated underlying structure and features. Still other examples include logical features (with semantic abstractions such as "yes" and "no"), and interaction features.

Note that the attack and fault detection algorithms can incorporate any number of features, with the number of features selected based on the Receiver Operating Characteristic ("ROC") curve analysis to optimize the detection and false alarm rates. Different number of features might be selected for each individual monitoring node, however, from a systems engineering perspective, to streamline the design, it may be preferred to choose the same type and number of features for all nodes, expect a particular node needs special treatment. For the forecasting at the global level (i.e., the system-level), the global feature vector may be formed by stacking up the local feature vectors of the individual monitoring nodes. For large scale systems with many monitoring nodes, the size of the global feature vector might be very large, and thus it can be reduced by dimensionality reduction techniques such as PCA.

Large scale systems might have hundreds of monitoring nodes. Feature discovery techniques may lead to selection of several features for each node, resulting a very large number of features to be forecasted. Some examples of methods that might be used for dimensionality reduction in such large-scale systems will now be described.

In feature space, the number of features may be reduced using data dimensionality reduction methods such as PCA, ICA, isoMap, etc. This may be done both the local and global levels. This enables the creation of scalable dynamic models.

Once the dynamic models are built, if the number of states (features and their lagged values) at each node or that of the global level is still large (normally>50), dynamic model order reduction techniques, such as balanced truncation or $H_\infty$ norm-based model order reduction may be used to further reduce the dimensionality of the forecasting problem. The model order reduction may be performed, according to some embodiments, using these two criteria:

Model Accuracy: The error between the original model and the recused order model is less than a prescribed threshold using Hankel norm or $H_\infty$ norm bounds. This determines the order of the reduced-order model. The error threshold may be selected by evaluating the forecasting accuracy of the reduced-order model or based on the preservation of the model observability (described below).

Model Observability: The reduced-order model remains observable. In particular, in the original model, the features might be both the states and the outputs (i.e., an identity state to output mapping). Hence, the reduced-order model may have more outputs that states. The order and the model accuracy threshold then are selected in a manner to preserve the observability.

Turning now to forecasting an anomaly score, if after dimensionality reductions in feature and/or state spaces, the order of the model is still high (normally>50) or if the dimensionality reduction cannot be done in a way to properly satisfy the aforementioned criteria, then instead of forecasting the features (e.g., FIG. 16), the anomaly score of the classifier may instead be directly forecasted (e.g., FIG. 17). In this approach, instead of forecasting the features and sending the forecasted features to the classifier, the dynamic models are built for the anomaly score time-series directly. Note that the anomaly score may be a scalar, so such a model may only have a single output. This may significantly simplify the model and reduce the number of model outputs (from the number of features to 1). Note that the anomaly score forecasting may be done both at the local or global levels. The states of the such a model may be the features or just the anomaly score. This approach essentially simplifies the problem into forecasting a scalar. Note that as shown in 17, this brings the decision boundary into the forecasting loop. The dynamic models built in this approach will collectively represent the feature evaluation and the anomaly score evolution combined.

Figure 24:
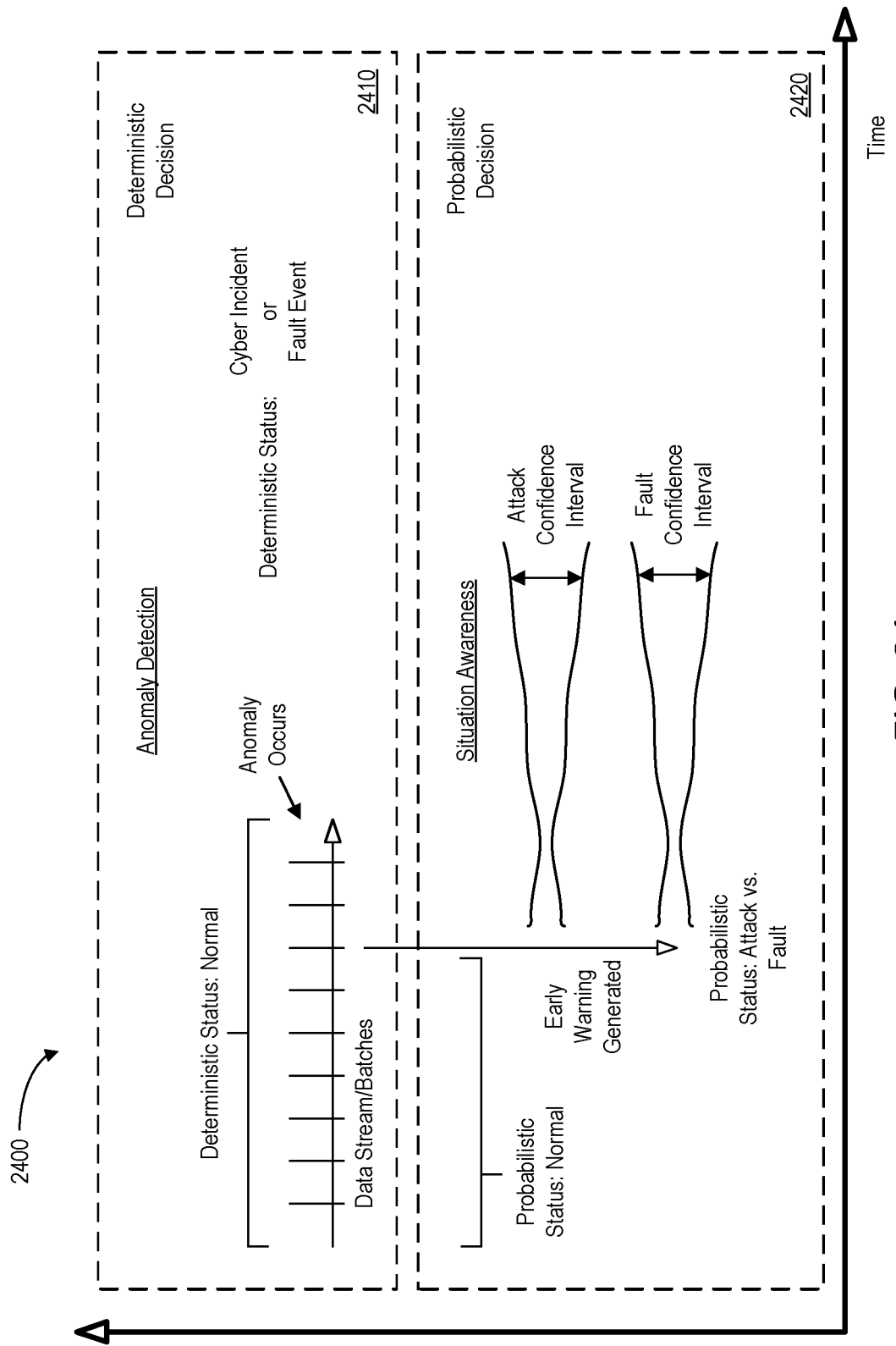
FIG. 24 is a deterministic and probabilistic decisions for situation awareness according to some embodiments.

As will be described in connection with FIG. 24, probabilistic predictive situation awareness may be performed. Once an early warning is generated, future forecasting still continues, with a probabilistic decision on whether an upcoming forecasted anomaly is an attack or a fault (with associated probabilities of occurrence for each). An attack vs. fault separation process may also be performed. Between the time an early warning is generated and the time an anomaly actually happens, the confidence intervals of attack and fault tightens (the confidence levels increase) until they reach their minima (maximum confidence) at the time of an actual anomaly (at which point the deterministic status also reflects the anomaly). The future forecasting may continue by the situation awareness block (with the confidence intervals naturally increasing as the prediction horizon expands).

According to some embodiments, the forecasting framework described in connection with FIGS. 16 and 17 may be based on ensemble models which are used in adaptive Kalman predictors to provide ensemble feature forecasts. The ensemble feature forecasts may then be averaged using dynamic weights to provide the overall feature forecast. Note that this process may be applied separately and in parallel to the local features of each individual monitoring node, as well as to the global feature vector.

In some embodiments, forecasting models at different time-scales (e.g., short-term, mid-term and long-term) may each consist of a collection of ensemble models that provide an ensemble forecast of the features. These ensembles may ensure coverage of whole operating space with operational and ambient condition variations. The operating space may be partitioned through GMM clustering. As used herein, the phrase "mixture model" may refer to, for example, a statistical model for representing datasets which display behavior that cannot be well described by a single standard distribution. It may allow for the building of a complex probability distribution from a linear superposition of simpler components. Gaussian distributions may be the most common choice as mixture components because of the mathematical simplicity of parameter estimation as well as their ability to perform well in many situations.

Gaussian mixture models can be used for stochastic data clustering. To select the operating point associated with each ensemble model, GMM clustering in the feature space may be used. The GMM clustering partitions the operating space (projected into feature space) into multiple clusters each represented by a multivariate Gaussian process described by a mean (centroid) and a covariance matrix. The centroid of each cluster represents the operating point for each ensemble model, while its covariance matrix establishes a probabilistic membership function. The Expectation Maximization ("EM") algorithm is a maximum likelihood estimation method that fits GMM clusters to the data. The EM algorithm can be sensitive to initial conditions, therefore, the GMM clustering may be repeated multiple times with randomly selected initial values and the fit that has the largest likelihood may be selected.

Since GMM is a soft clustering method (i.e., overlapping clusters), all points in the operating space belong to all clusters with a membership probability. As an example, consider GMM clustering at the global level for a gas turbine data set. Different numbers of cluster (k) may be evaluated via Bayesian Information Criterion ("BIC") using different covariance structures (e.g., diagonal-shared, full-shared, diagonal-unshared, and full-unshared). BIC may provide and appropriate trade-off between model accuracy and complexity, thus avoiding over-fitting to the training data set. The model with the lowest BIC may then be selected. Note that at the local node level, GMM clustering may be done for each monitoring node separately, resulting in different numbers of ensembles for each monitoring node.

The GMM clustering may be associated with a selected centroid of the clusters as any arbitrary real-valued vector in the feature space. However, since centroids are deemed as operating points to create state-space models, they are supposed to be associated with physical operating points of the system. This can be achieved in two ways:

Mixed-integer programming for EM: GMM clustering uses Expectation Maximization ("EM") algorithm for cluster optimization. Rather than running the standard EM, one can use a modified EM to enforce searching for centroids only among the points given in the training data set (which are readily physical points of the systems). This is essentially, similar to running k-medoids clustering rather than k-means clustering but in a GMM framework. This normally requires mixed-integer programming and is feasible for small and medium size data sets.

Heuristics-based: Adjust the centroids of GMM into closest point in the data set in post-processing. This may be particularly efficient for large data sets. Moreover, since large data sets comprise of high granularity data, the distance of the centroid to the closest point in the data is often small and negligible. This can be further validated by putting a threshold on such point adjustments. As a result of centroid adjustment, the covariance matrices of each GMM clusters are also adjusted. Suppose that $\mu_i$ and $\Sigma_i$ are the centroid and covariance of the i-th cluster, respectively, and the closest point to $\mu_i$ is $\bar{\mu}_i$ whose Euclidian distance to $\mu_i$ in feature space is $d_i$, i.e. $\bar{\mu}_i - \mu_i = d_i$. Then:

$$\mu_i \rightarrow \bar{\mu}_i = \mu_i + d_i,$$

$$\Sigma_i \rightarrow \bar{\Sigma}_i = \Sigma_i + d_i d_i^T,$$

which means that the Gaussian model associated with the i-th cluster is adjusted from $\mathcal{N}(\mu_i, \Sigma_i)$ to $\mathcal{N}(\bar{\mu}_i, \bar{\Sigma}_i)$.

Once the number and structure of the clusters are determined, the cluster centroids may be selected as the representative operating points of the system, and a dynamic model may be developed for the time series of each monitoring node of each operating point (also known as "ensemble models"). The time series may be modeled as VAR models (e.g., a multivariate autoregressive model) that relates the current value of the time-series to its previous values through a linear mapping plus a constant bias term. Essentially, this is not an input-output modeling but a time-series output modeling, assumed to be derived by an unknown stochastic input. VAR models are vastly used for modeling of time-series signals, similar to what is measured here from monitoring nodes. The number of lags required for each VAR model is again determined using BIC. The order of the models may also be determined (which could be different among the ensembles). The parameters of the VAR models are identified, and the models are then converted into the standard state space form for each ensemble, as follows:

$$x[k+1] = Ax[k] + Bu[k] + Qu[k],$$

$$y[k] = Cx[k] + v[k],$$

where, x is the vector of monitoring node features and their lagged values, u is a fictitious Heaviside step function capturing the bias term of the VAR model, e is a zero-mean Gaussian white noise with Identity covariance, $E[ee^T] = I$, and Q is the process noise covariance. The model outputs y, here are the monitoring node features with some assumed measurement noise v, whose covariance R, is adaptively updated described below.

If the model is VAR (1), i.e. having one lag, then $C = I_q$, where q is the number of local features for each individual monitoring node. In general, for a VAR (p) model with p lags, per ensemble, per node:

$$x[k] = \begin{bmatrix} x_1^f[k] & \ldots & x_q^f[k] & \ldots & x_1^f[k-p+1] & \ldots & x_q^f[k-p+1] \end{bmatrix}^T,$$

$$A = \begin{bmatrix} A_1 & A_2 & \ldots & A_{p-1} & A_p \\ I_q & O_q & \ldots & O_q & O_q \\ O_q & I_q & \ldots & O_q & O_q \\ \vdots & \vdots & \ddots & \vdots & \vdots \\ O_q & O_q & \ldots & I_q & O_q \end{bmatrix},$$

$$B = \begin{bmatrix} b & \underbrace{O_q \ldots O_q}_{1,\ldots,p-1,p>1} \end{bmatrix}^T,$$

$$C = \begin{bmatrix} I_q & \underbrace{O_q \ldots O_q}_{1,\ldots,p-1,p>1} \end{bmatrix},$$

where $x_i^f$, $i = 1, \ldots, q$ are the local features for an individual monitoring node.

The initial value of R is set using noise characteristics of the raw measurements, linearly projected into the feature space as follows. Suppose $y^r$ is the raw measured value of an individual monitoring node and the scalar $v^r$ is the corresponding measurement noise, $y^r[k] = r[k] + v^r[k]$, where r is the true value of the signal and $v^r$ is a zero-mean Gaussian white noise with variance $\sigma$. The feature vector y corresponding to this particular monitoring node is the projection of $y^r$ in the feature space. Suppose that $\mathcal{F}: R \rightarrow R^q$ is the mapping from the raw signal measurement to its features. The raw data is projected into the feature space as:

$$\begin{bmatrix} x_1^f[k] & \ldots & x_q^f[k] \end{bmatrix}^T = Cx[k] = \mathcal{F}(r[k]).$$

Then:

$$y[k] = \mathcal{F}(y^r[k]) = \mathcal{F}(y[k] + v^r[k]) \simeq \mathcal{F}(r[k]) + \frac{\partial \mathcal{F}}{\partial r}\bigg|_{r=r[k]} v^r[k] \triangleq$$

$$Cx[k] + J(r[k])v^r[k] \triangleq Cx[k] + v[k],$$

where v is the derived measurement noise in the feature space and J is the Jacobian of $\mathcal{F}$ with respect to r. From the equation for y[k] above, it is clear that the covariance of v is $\sigma J(r[k])^T J(r[k])$. Note that the scalar measurement noise of an individual monitoring node in the signal space is projected into a multivariate noise in the feature space. The linear approximation of noise maintains the noise zero-mean Gaussian white. This approximation is only used for the initial guess of the covariance, since after the initialization, it is adaptively estimated.

As mentioned before, the number of such state space models for each monitoring node, equals the number of corresponding GMM clusters. The order of the state space models remains the same within the ensembles of one particular node, but may differ from one node to another depending on the number of local features selected for each node.

Figure 18:
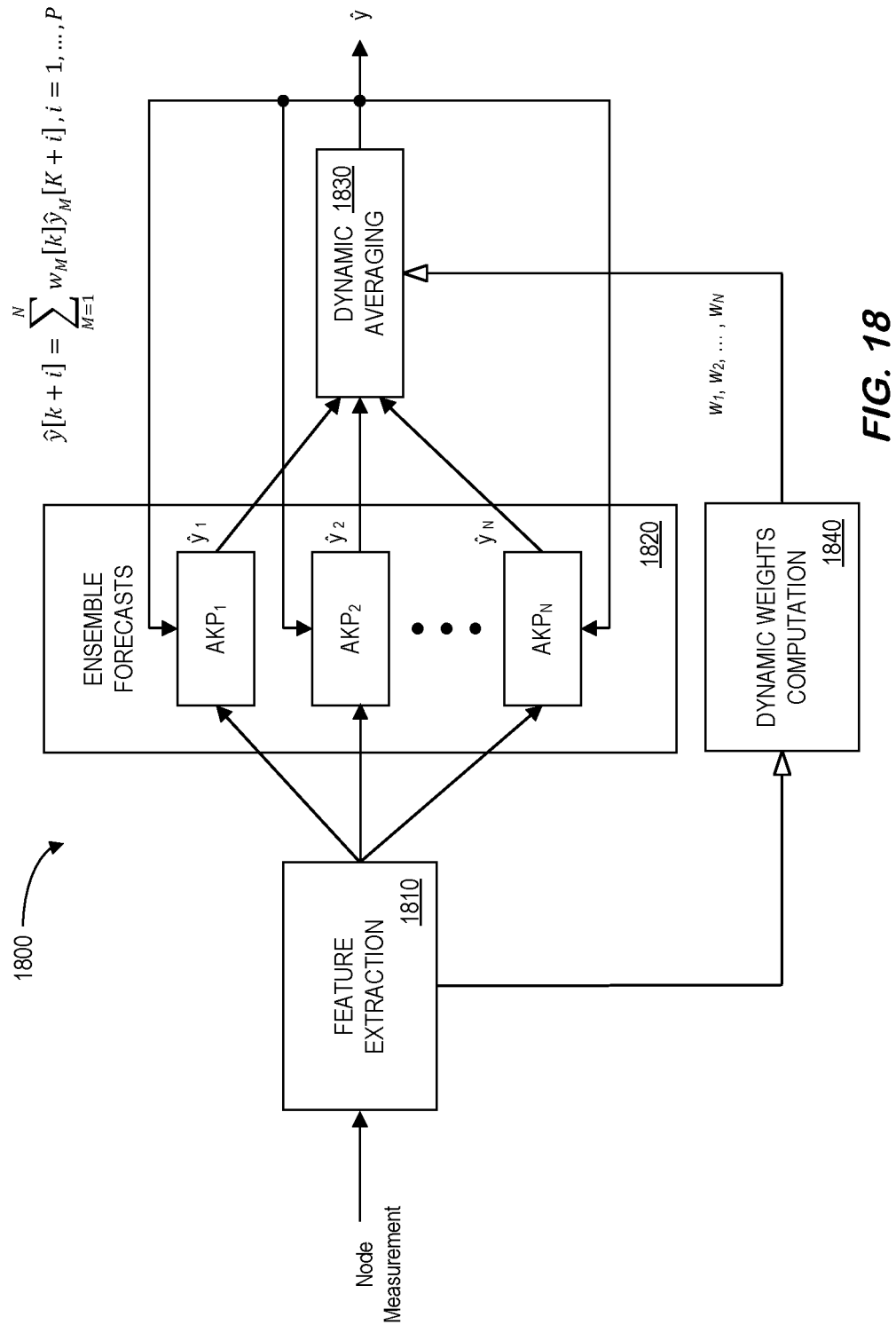
FIG. 18 is a block diagram for dynamic ensemble forecast averaging according to some embodiments.

According to some embodiments, an Adaptive Kalman Predictor ("AKP") may be applied to each ensemble model to provide ensemble forecasts. The process noise covariance of the Kalman predictor may be readily available as Q. The covariance of the measurement noise of each AKP may be estimated adaptively using a method as follows:

$$\hat{v} = y[k] - C^T \hat{x}[k \mid k-1],$$

$$R[k] = \begin{cases} \sigma J(r[k])^T J(r[k]) & k = 1, \ldots m \\ \frac{1}{m} \left[ \sum_{j=1}^{m} \hat{v}[k-j]\hat{v}[k-j] \right] \ldots C^T P^e[k \mid k-1] C & k > m \end{cases}$$

where $\hat{v}$ is the predictor innovation sequence, m is the width of an empirically chosen rectangular smoothing window for the innovations sequence, and $P^e$ is the prediction error covariance matrix. The smoothing operation improves the statistical significance of the estimator for R[k], as it now depends on many residuals. FIG. 18 shows a block diagram 1800 for dynamic ensemble forecast averaging, where N is the number of ensembles corresponding to a monitoring node and P is the forecasting horizon. Feature extraction 1810 is performed on node measurements and the results are provided to AKP filters in the ensemble forecasts 1820. The outputs of the AKP filters are provided to dynamic averaging 1830, which also receive information from dynamic weights computation 1840. The ensemble modeling (GMM clustering and state space system identification) may be performed using only a normal dataset because the models capture the normal operational behavior of the system, while the decision boundaries are computed using both normal and abnormal datasets.

The forecasting horizon of the multi-step forecasts can be determined using simulations, based on the prediction error and some threshold on the confidence interval. As the forecasting horizon extends, the confidence interval expands and eventually passes the threshold. Each AKP provides an ensemble forecast $\hat{y}_M$, M=1, ..., N. The ensemble forecasts are dynamically averaged using weight $w_1, \ldots, w_N$. The weights are time-varying and computed as normalized probabilities using the Multivariate Gaussian probability density functions with mean and covariances computed during the GMM clustering. Suppose the real-time value of the feature vector is x[k], and the mean and covariance of each Gaussian cluster are $\mu_i$ and $\Sigma_i$, respectively. Then:

$$d_M[k] = Pr\left\{x[k] \mid x[k] \sim N\left(\mu_i, \sum_i\right)\right\}, M = 1, \ldots, N,$$

$$w_M[k] = \frac{d_M[k]}{\sum_{M=1}^{N} d_M[k]}, \sum_{M=1}^{N} w_M[k] = 1,$$

$$\hat{y}[k+i] = \sum_{M=1}^{N} w_M[k]\hat{y}_M[K+i], i = 1, \ldots, P.$$

The ensemble averaged forecast $\hat{y}[k+i]$ is returned back to the AKPs as the next input, to provide the next-step forecast receding horizon fashion, up to the forecasting horizon. Alternatively, the ensemble forecast of each AKP, $\hat{y}[k+i]$, could be fed back for multistep forecasting. Feeding back $\hat{y}[k+i]$ to all AKPs, however, may provide a better prediction of the system's true behavior.

The forecasted features, $\hat{y}$, may be compared to a decision boundary for anomaly forecasting in each node. At each sampling time, a P-step ahead forecast of the features may be computed using the dynamic ensemble averaging method. In the next sampling time, the horizon moves forward (recedes) by one time-step, and a new forecast is computed through the new forecasting horizon:

k: $[\hat{y}[k+1], \hat{y}[k+2], \ldots, \hat{y}[k+P]]$, k+1: $[\hat{y}[k+2], \hat{y}[k+3], \ldots, \hat{y}[k+P+1]]$, k+2: $[\hat{y}[k+3], \hat{y}[k+4], \ldots, \hat{y}[k+P+2]]$, At each sampling time, the last forecast in the horizon, $\hat{y}[k+P]$, is compared to the decision boundary. This is similar to the Model Predictive control ("MPC"), except that in MPC, at each sampling time, the first control action in the horizon is applied to the system.

Each decision boundary is computed by training a classifier, such as an Extreme Learning Machine as a binary classifier in a supervised training framework. An Extreme Learning Machine ("ELM") is a special type of feed-forward neural networks that has been recently introduced. ELM was originally developed for the Single-hidden Layer Feedforward Neural-networks ("SLFNs") and was later extended to the generalized SLFNs where the hidden layer need not be neuron alike. Unlike traditional feed-forward neural networks, where training the network involves finding all connection weights and bias, in ELM connections between input and hidden neurons are randomly generated and fixed. That is, they do not need to be trained. Thus, training an ELM becomes finding connections between hidden and output neurons only, which is simply a linear least squares problem whose solution can be directly generated by the generalized inverse of the hidden layer output matrix.

Figure 19:
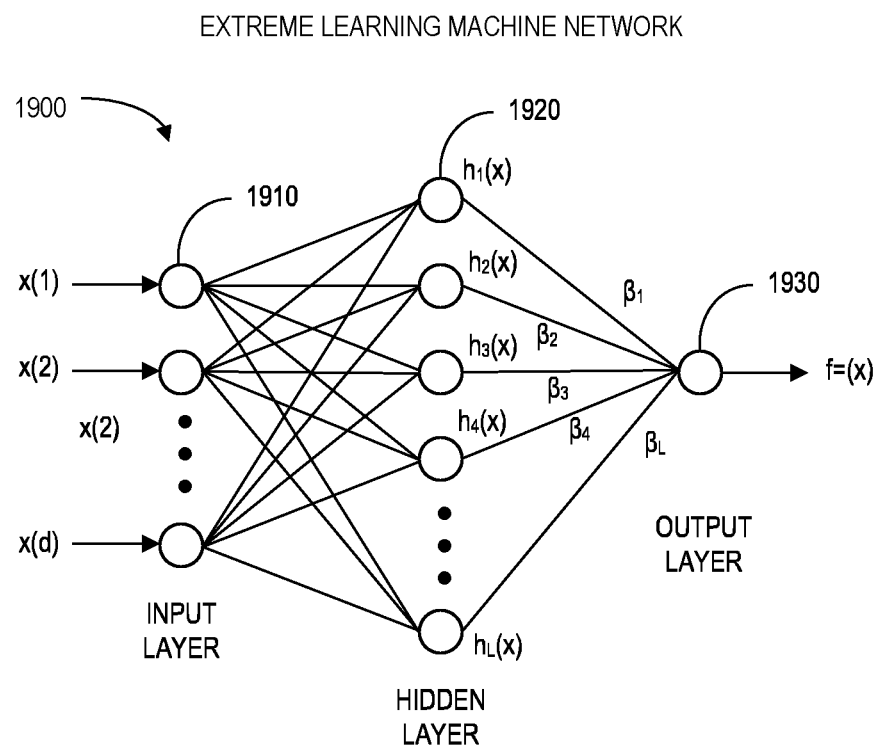
FIG. 19 is an extreme learning machine network with one output in accordance with some embodiments.

Because of the special design of the network, ELM training becomes very fast. The structure of a one-output ELM network 1900 is depicted in FIG. 19, including an input layer 1910, a hidden layer 1920, and the singe node output lager 1930. If the number of hidden neurons 1920 is L, then the output function of ELM for generalized SLFNs is:

$$f(x) = \sum_{j=1}^{L} \beta_j h_j(x) \triangleq h(x)\beta,$$

where $h_j(x)=G(\phi_j, b_j, x)$ is the output of $j^{th}$ hidden neuron 1920 with respect to the input x, $G(\phi, b, x)$ is a nonlinear piecewise continuous function satisfying ELM universal approximation capability theorems, $\beta_j$ is the output weight vector between $j^{th}$ hidden neuron 1920 to the output node 1930. $H(x)=[h_j(x), \ldots, k_L(x)]$ is a random feature map, mapping the data from d-dimensional input space to the L-dimension random feature space (ELM feature space).

The objective function of ELM is an equality-constraints optimization problem, to minimize both the training errors and the output weights, which can be written as:

$$\text{Minimize } L_p = \frac{1}{2}\|\beta\|^2 + \frac{1}{2}c\sum_{i=1}^{N_d} \xi_i^2$$

$$\text{s.t.: } h(x_i)\beta = l_i - \xi_i, i = 1, \ldots, N_d$$

where $\xi_i$ is the training error with respect to the training sample $x_i$, $l_i$ is the label of the $i^{th}$ sample and $N_d$ is the number of training samples (in the normal and abnormal datasets combined). The constant C controls the tradeoff between the output weights and the training error.

Based on the Karush-Kuhn-Tucker ("KKT") condition, the analytic solutions for the ELM may be output function f for non-kernel and kernel cases, respectively. Since kernel twoclass ELM learns a nonlinear hyper plane, it generally works better than non-kernel two-class ELM. Therefore, a kernel ELM using a Radial Basis Function ("RBF") kernel may be used.

The distance d of any point (a sample) to the hyper plane constructed by the ELM can conveniently serve as an anomaly score, that is, the larger the distance, the more likely the sample is abnormal. Here f is an anomaly score function whose sign (compared to a threshold, normally, zero) determines the binary classification decision on the system status. The ELM may be trained such that normal samples generate negative scores.

Figure 20:
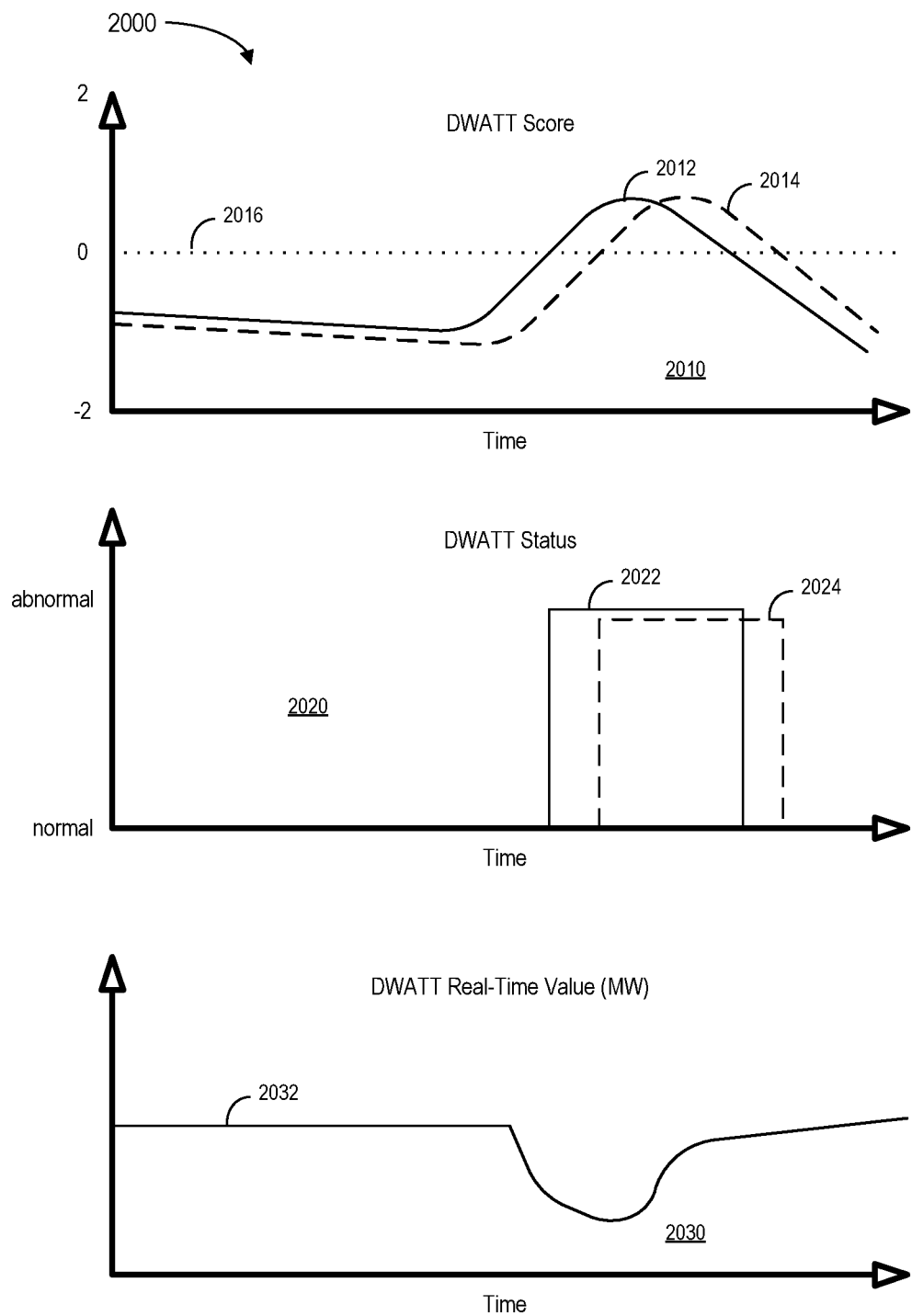
FIG. 20 illustrates anomaly forecast and early warning generation for a DWATT sensor according so some embodiments.

To generate an early warning, forecasted outputs of models (also known as the future values of the features) may be compared to corresponding decision boundaries for anomaly detection. While comparing the feature vectors to the decision boundary, an estimated time to cross the decision boundary will provide information for future anomaly. FIG. 20 shows early warning generation 2000 for a DWATT (gas turbine generated power) sensor false data injection attack based on a short-term (10 seconds ahead) forecast. In particular, a first graph 2010 shows DWATT score values over time, including a forecasted score 2012 (solid line) and current-time score 2014 (dashed line) that are compared to a threshold value 2016 (dotted line). A second graph 2020 shows DWATT status over time, including a forecasted status 2022 (solid line) and a current-time status 2024 (dashed line), with a status 2022, 2024 moving between "normal" and "abnormal" based on score values compared to the threshold 2016 in the first graph 2016. A third graph 2030 shows a DWATT real-time Megawatt ("MW") value 2032 over time reflecting the impact of the cyber-attack/fault detected in the first two graphs 2010, 2020.

Note that the attack case was not included in the training data set, so this simulation represents an independent cross-validation of the algorithm. The attack is injected at t=129. Without forecasting, the detection algorithm detects it at t=150. With the 10-second ahead forecast, the forecasted features pass the local boundary at t=140, at which point an early warning is generated. As seen, the forecasting is able to generate early warning 10 seconds ahead of the actual detection happening. This technology may be able to compensate for the delay in detection and generate early warning in the very early stage of an attack. Similarly, once the disturbance rejection control of the gas turbine brings the system back into the normal region, the forecasting algorithm is able to predict that before the actual system status goes back to normal. Note that here the system is forecasting the features directly, and the anomaly score indirectly by passing the forecasted features through the decision boundary. Hence, the confidence intervals of ensemble feature forecasts are readily available from the AKPs, while those of the averaged forecasts and the anomaly score are computed using interval arithmetic. The forecasted features might be computed, for example, in a receding horizon with a forecasting horizon of 10 seconds (i.e., 10-steps ahead forecasts are used for anomaly decision). In every sampling time, a 10-second forecast is computed along with its confidence interval. In the next sampling time, a new receding horizon forecast may be computed, sliding the previous horizon by 1 second.

Figure 21:
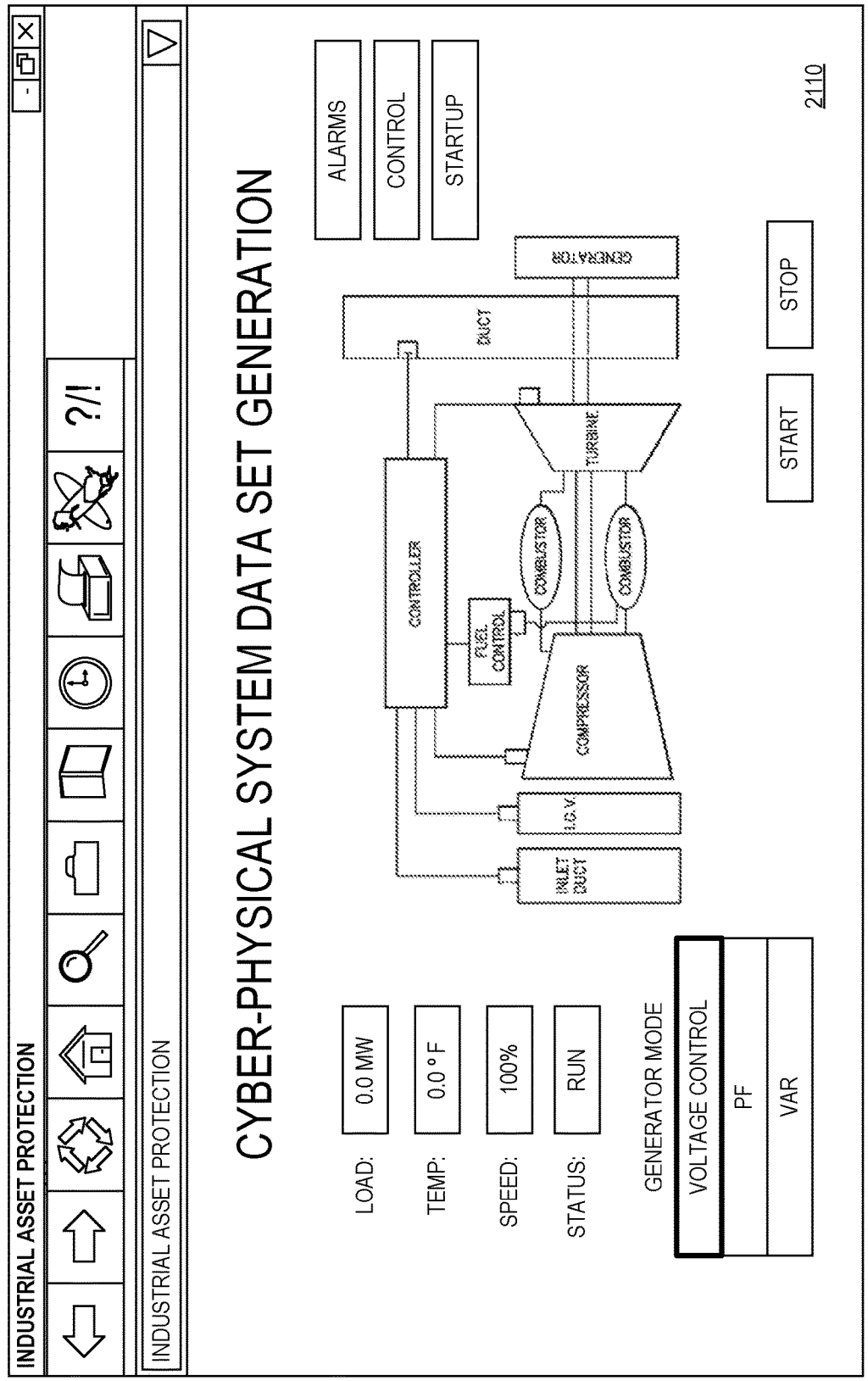
FIG. 21 is a plant human-machine interface display for data set generation in accordance with some embodiments.

Some embodiments described herein provide predictive situation awareness and dynamic ensemble forecasting of abnormal behavior in a cyber-physical system (e.g., such as an industrial control system). According to some embodiments, a framework may be used for anomaly forecasting and early warning generation. The framework may be applicable to both cyber-driven and fault-driven incidents in a unified manner. Moreover, some embodiments might be tested using both normal and abnormal (attack and fault) data sets created using a high-fidelity power plant simulation platform. The data set might, for example, consist of thousands of normal and abnormal time series of the monitoring nodes, resulting in over 2 million samples when projected into feature space. FIG. 21 shows a Human Machine Interface ("HMI") display 2100 that might be used for data set generation in accordance with some embodiments. The display 2100 includes a graphical representation 2110 of a cyber-physical system (e.g., a gas turbine) along with parameter values (e.g., load, temperature, speed, etc.) and control icons (e.g., generator mode selections, a start icon, a stop icon, etc.). The industrial asset protection display 2100 that might be used, for example, to provide a graphical depiction 2110 to an operator and/or to provide an interactive interface allowing an operator to adjust system components as appropriate. Selection of an item on the display 2100 (e.g., via a touchscreen or computer mouse pointer) may let the operator see more information about that particular item and/or adjust operation of that item (e.g., by altering a situation awareness parameter).

Figure 22:
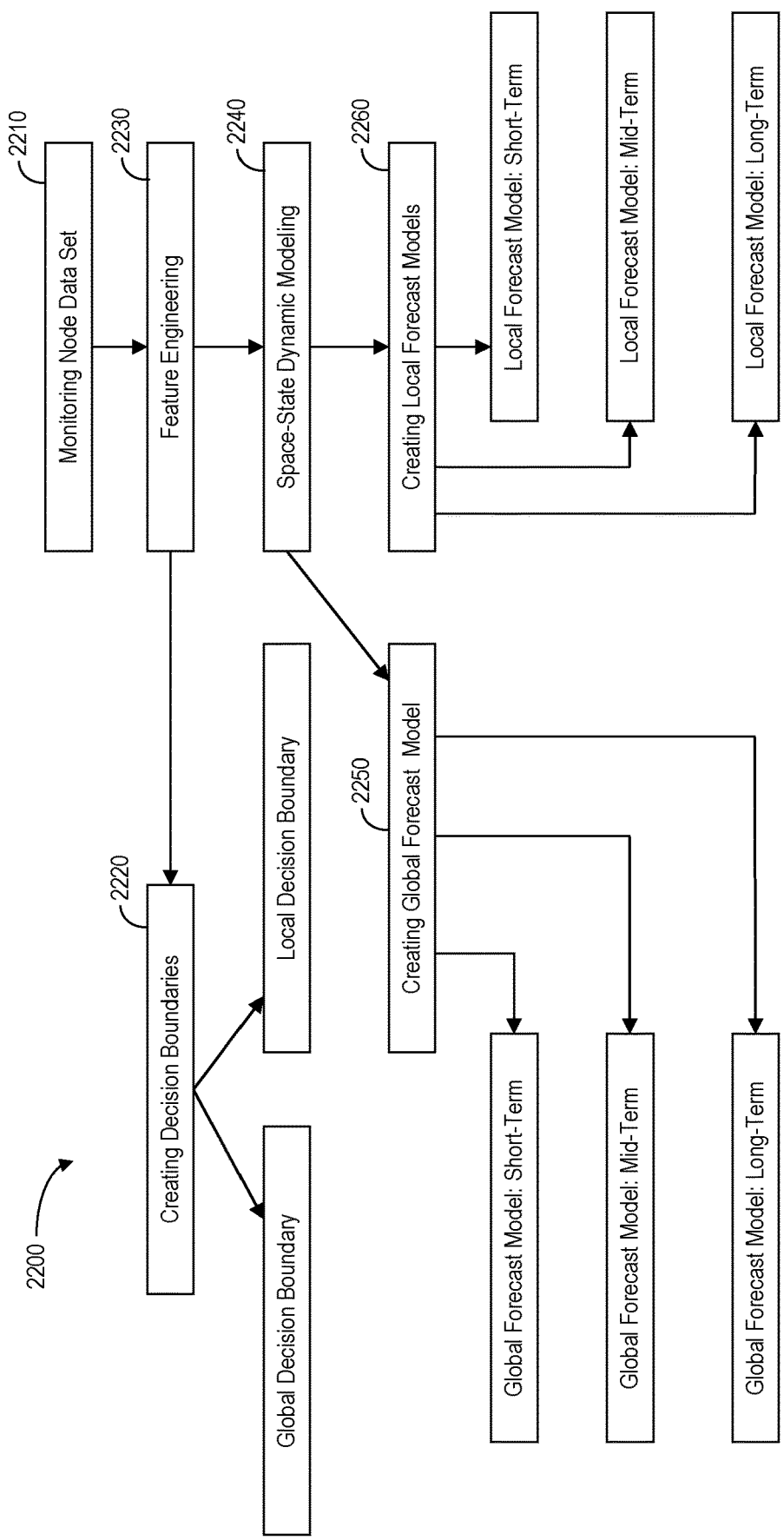
FIG. 22 is a diagram illustrating an off-line training process for anomaly forecasting in accordance with an example embodiment.
Figure 23:
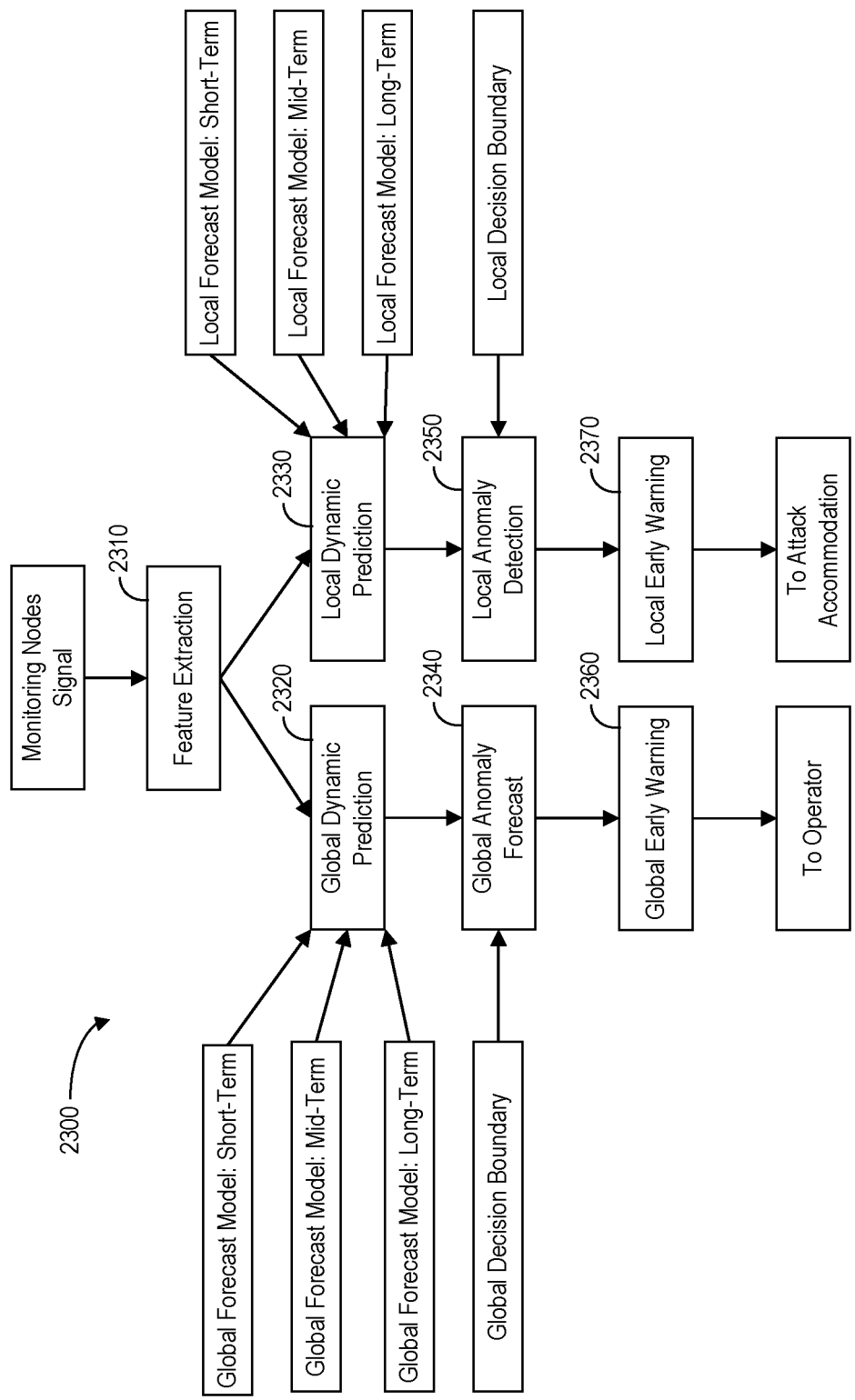
FIG. 23 is a diagram illustrating an on-line anomaly forecasting process in accordance with an example embodiment.

A forecasting system may be comprised of off-line (training) and on-line (operation) modules. During the off-line training, as shown in FIG. 22, a process 2200 might include an algorithm wherein monitoring node data sets are used for feature engineering and decision boundary generation. Note that FIG. 22 illustrates a training process 2200 for anomaly forecasting in accordance with an example embodiment, and FIG. 23 illustrates an anomaly forecasting process 2300 in accordance with an example embodiment. In some cases, the training process 2200 may be performed while the forecasting system is offline while the forecasting process 2300 may be performed while the system is online. The training process 2200 may generate an anomaly forecaster for cyber-physical systems that can be used for cyber-attack or fault detection, localization and early warning. The training process 2200 may be used to develop feature-driven dynamic models in three different time-scales, including short-term (seconds ahead), mid-term (minutes ahead) and long term (hours to days ahead). However, the embodiments are not limited to these time scales, based on historical data associated with an asset or system.

In 2210, monitoring node data sets are provided and may include feature data for use in feature engineering. The monitoring node data sets are used for feature engineering and decision boundary generation. For example, in 2220, decision boundaries are generated for each monitoring node. For example, the decision boundaries may include one or more local decision boundaries (or individual node boundaries) and one global decision boundary (or a combined decision boundary based on a combination of monitoring nodes). In 2230, state space dynamic models are generated for the time-evolution of features both for global features and local features (i.e., per monitoring node). Parameters and orders of each state space dynamic model may be estimated as VAR models which are further described below.

In 2240 and 2250 forecast models (e.g., local and global) are generated. For each of the global and local forecast models, in this example, three models are used including a short-term forecasting model, a mid-term forecasting model, and a long-term forecasting model. For example, the short-term forecast model may be a dynamic state space with a VAR model with a sampling time of 1 second, the mid-term forecast model may be a dynamic state space with a VAR model with a sampling time of 1 minute or more but less than 1 hour, and the long-term forecast model may be a dynamic state space with a VAR model with a sampling time of 1 hour or more but less than a day. Similar models are generated for local features, per monitoring node. For example, if there are 6 monitoring nodes, the off-line module may generate a total of 21 state space models consisting of 22 global forecast models and 18 local forecast models.

According to some embodiments, a multivariate Vector Auto-Regressive ("VAR") model approach may be used to fit dynamic models into feature time series data. A VAR model may, for example, have the following form:

$$y(k+1)=A_1 y(k)+A_2 y(k-1)+ \ldots +A_p(k-p+1)+b+e(k)$$

where y(k) is the value of the multivariate feature time series at sample time t, p is the number of lags (i.e., delays) in the model, b is a constant affine term, and e(k) is white Gaussian random noise. The size of they vector, m, may equal the number of features selected. A VAR(p) model may be identified for each monitoring node, resulting in matrices $A_1$ to $A_p$, the b vector, and covariance matrix Q of e, for each node.

As the number of lags in the VAR model increase, the model fits better into the training data set but there are more parameters n of the model to be estimated. The order of the VAR model, p, may selected automatically using Bayesian Information Criterion ("BIC") or Akaike Information Criterion ("AIC"). Note that BIC may provide a good balance between the model fitness and complexity (e.g., to avoid over-fitting). The system may use a weighted average of features to compute the BIC per different lag numbers. In computing the weighted average BIC, the BIC value of each feature might be weighted by the magnitude of the feature so that the features with higher magnitudes are weighted more, and as such fitting a better model to those features becomes more important. The number of lags in the model, p, is then selected based on the value of p, that minimize the weighted averaged BIC. The identified VAR(p) model may then be converted into standard state space structure. This process may be done separately for each monitoring node, which may be the result of different values of p for each monitoring node. Note that the conversion to standard state space may be written in compact form as:

$$x(k+1)=Ax(k)+Bu(k)+Ee(k)$$

$$y(k)=Cx(k)$$

where, u(k) is a fictitious unit step input to accommodate for the affine term. During the training phase, one such state space feature-driven dynamic model may be built for each monitoring node. Although a VAR modeling approach is described herein, note that other modeling approaches might be used instead in any of the embodiments (e.g., a Markov model approach).

To select the features, feature discovery techniques are used. Then, state space ensemble dynamic models are generated for the time-evolution of features both at the global (for overall system status) and local (i.e., per monitoring node). At each level, dynamic forecasting models are generated for forecasting at three different time scales: short-term, mid-term and long-term (depending on the fundamental sampling time of the contro system). Also, decision boundaries may be computed both at the local and global levels as binary classifiers using machine learning.

The on-line module of forecasting system in shown in FIG. 23. In 2310, each monitoring node signal goes through real-time feature extraction to create real-time feature time series. The features may be computed using a sliding window over the monitoring node signals. In 2320 and 2330, the extracted feature time series are input to multi-step predictors for both global features and local features. In this example, there is one multi-step predictor per forecasting model. For example, the multi-step predictors may be based on a Kalman filter, a receding horizon predictor, or any multi-step prediction method. The multi-step predictors can use constant or adaptive (time-varying) process and measurement noise covariance matrices. For constant covariance matrices, Q matrix may be used to process noise covariance and may be recursively fed into the measurement noise covariance for future predictions. The adaptive values of the covariance matrices may be initialized using the prescribed constant values and changed in real-time based on X-square tests on the normalized innovation (output estimation error). The predictors may also utilize a forgetting factor to weight current estimates vs. previous values.

Using the models generated in the training phase and the multi-step predictors, in 2340 and 2350 future values of the feature time series are forecasted, both for local and global features, in three time scales including short-term feature forecast: feature values of the global and local features up to several seconds, mid-term forecast model: feature values of the global and local features up to several minutes, and long-term forecast model: feature values of the global and local features up to several days.

The prediction horizon of the multi-step forecasts can be determined using simulations, based on the prediction error and a confidence interval. For example, the prediction horizon may be up to the point that the actual prediction error is larger than three standard divisions of the corresponding eigenvalue of the Kalman filter estimation error covariance matrix (e.g., 99% confidence). Alternatively, the prediction horizon may be bound to the quality of the forecasting models. For example, the prediction horizon may be set up to the point that the norm of the Kalman filter estimation error covariance matrix, P, becomes three times larger than the norm of the process noise covariance matrix, $E^T QE$, in the forecast model.

$$\|P\|>3*\|E^T QW\|$$

The forecasted outputs of models (also known as future values of the features) are compared to the corresponding decision boundaries for anomaly detection. While comparing the feature vectors to the decision boundary, estimated time to cross the decision boundary will provide information for future anomaly. If a future anomaly is detected, an early warning is generated in 2360 and/or 2370 in the operator display with anticipated time to reach anomalous state and a message may be sent to the automatic accommodation system for potential early engagement, threat neutralization, and the like.

Thus, the online module may be summarized as follows. First, each monitoring node signal goes through real-time feature extraction to create real-time feature time series. The features are computed using a sliding window over the monitoring node signals. In the next step, the extracted feature time series, are inputted to multi-step predictors, both at the local and global levels. Using the models generated in the training phase and the multi-step predictors, future values of the feature time series are forecasted, both for local and global features, in three-time scales:

Short-term feature forecast: future values of the global and local features (e.g., up to several seconds), Mid-term feature forecast: future values of the global and local features (e.g., up to several minutes), and Long-term feature forecast: future values of the global and local features (e.g., up to several days).

The forecasted outputs of models (also known as future values of the features) are compared to the corresponding decision boundaries for anomaly detection. While comparing the feature vectors to the decision boundary, estimated time to cross the decision boundary will provide information for future anomaly. If a future anomaly is detected, an early warning is generated in the operator display with anticipated time to reach anomalous state and a message is sent to the automatic accommodation system (such as an attack-tolerant or fault-tolerant resilient control mechanism) for potential early engagement.

With respect to predictive situation awareness, note that data may be coming in steam or batch modes. FIG. 24 shows an example 2400 of an anomaly detection block 2410 and a situation awareness block 2420 according to some embodiments. The anomaly detection block 2410 provides a deterministic decision on the system status, which is either normal, spoofing or system event. Before an anomaly happens, the deterministic system status is normal and it remains normal until an anomaly actually happens. The anomaly detection algorithm detects an anomaly once it happens and decides whether it a spoofing or a system event. The situation awareness block 2420 provides a probabilistic decision and generates early warnings. At each time instant, the situation awareness block 2420 projects the current status into future using stochastic dynamic forecast. The probabilistic status remains normal until the confidence interval of the normal status becomes so large (confidence level drops), that warrants early warning generation. Once an early warning is generated, future forecasting still continues, with a probabilistic decision on whether an upcoming forecasted anomaly is an attack or a fault (with associated probabilities of occurrence for each). Between the time an early warning is generated and the time an anomaly actually happens, the confidence intervals of attack and fault tightness (confidence levels increase), until they reach their minima (maximum confidence) at the time of an actual anomaly, (at which the determinate status also reflects the anomaly). The future forecasting still continues by the situation awareness block, with the confidence intervals naturally increasing as the prediction horizon expands.

Figure 25:
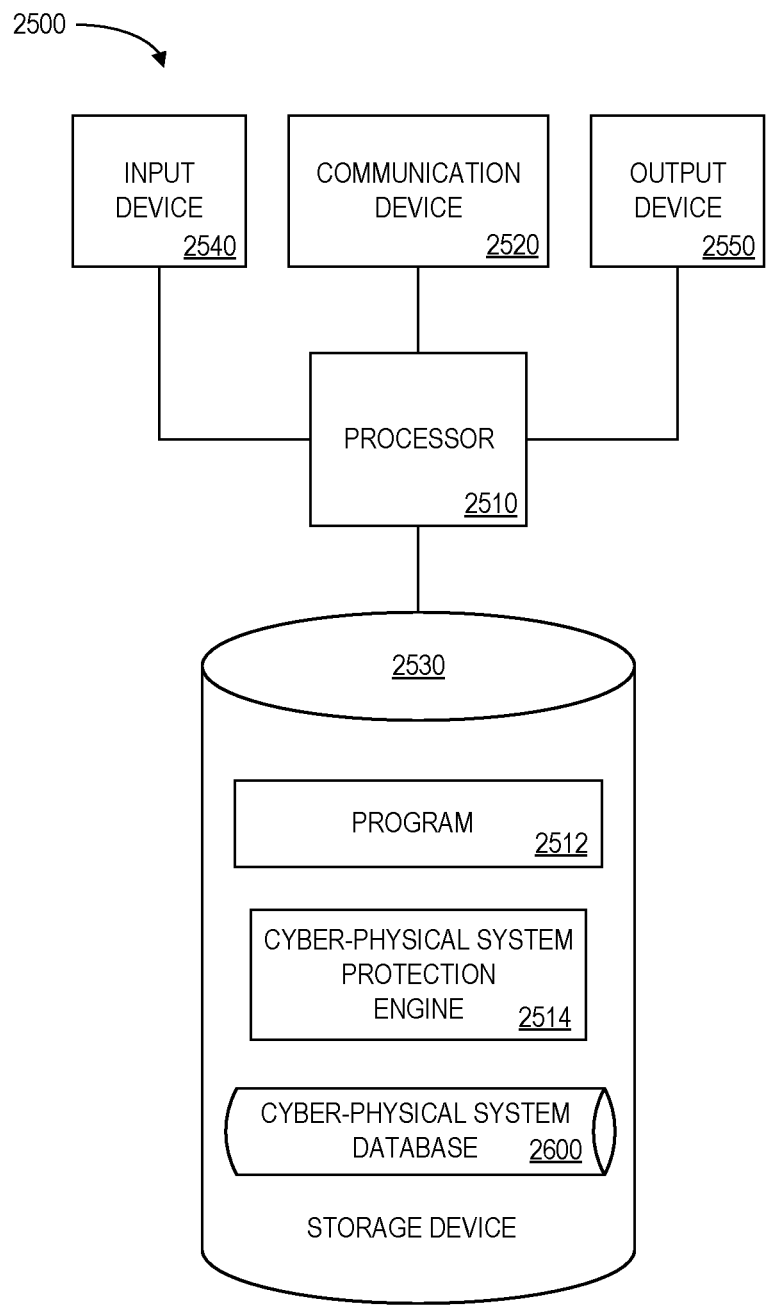
FIG. 25 is a cyber-physical system protection platform according to some embodiments.

Note that the embodiments described herein may be implemented using any number of different hardware configurations. For example, FIG. 25 is a block diagram of a cyber-physical system protection platform 2500 that may be, for example, associated with the system 100 of FIG. 1 and/or any other system described herein. The cyber-physical system protection platform 2500 comprises a processor 2510, such as one or more commercially available Central Processing Units ("CPUs") in the form of one-chip microprocessors, coupled to a communication device 2560 configured to communicate via a communication network (not shown in FIG. 25). The communication device 2560 may be used to communicate, for example, with one or more remote monitoring nodes, user platforms, digital twins, etc. The cyber-physical system protection platform 2500 further includes an input device 2540 (e.g., a computer mouse and/or keyboard to input industrial asset and/or predictive modeling information) and/an output device 2550 (e.g., a computer monitor to render a display, provide alerts, transmit recommendations, and/or create reports). According to some embodiments, a mobile device, monitoring physical system, and/or PC may be used to exchange information with the cyber-physical system protection platform 2500.

The processor 2510 also communicates with a storage device 2530. The storage device 2530 may comprise any appropriate information storage device, including combinations of magnetic storage devices (e.g., a hard disk drive), optical storage devices, mobile telephones, and/or semiconductor memory devices. The storage device 2530 stores a program 2512 and/or cyber-physical system protection engine 2514 for controlling the processor 2510. The processor 2510 performs instructions of the programs 2512, 2514, and thereby operates in accordance with any of the embodiments described herein. For example, the processor 2510 may receive from a plurality of monitoring nodes that each generate a time-series of current monitoring node values representing current operation of a cyber-physical system. The processor 2510 may receive the time-series of and generate a set of current feature vectors using feature discovery techniques. The feature behavior for each monitoring node may be characterized by processor 2510 in the form of decision boundaries that separate normal and abnormal space based on operating data of the system. A set of ensemble state-space models may be constructed by processor 2510 to represent feature evolution in the time-domain, wherein the forecasted outputs from the set of ensemble state-space models comprise anticipated time evolution of features. The processor 2510 may then obtain an overall features forecast through dynamic ensemble averaging and compare the overall features forecast to a threshold to generate an estimate associated with at least one feature vector crossing an associated decision boundary.

The programs 2512, 2514 may be stored in a compressed, uncompiled and/or encrypted format. The programs 2512, 2514 may furthermore include other program elements, such as an operating system, clipboard application, a database management system, and/or device drivers used by the processor 2510 to interface with peripheral devices.

As used herein, information may be "received" by or "transmitted" to, for example: (i) the cyber-physical system protection platform 2500 from another device; or (ii) a software application or module within the cyber-physical system protection platform 2500 from another software application, module, or any other source.

In some embodiments (such as the one shown in FIG. 25), the storage device 2530 further stores a cyber-physical system database 2600. An example of a database that may be used in connection with the cyber-physical system protection platform 2500 will now be described in detail with respect to FIG. 26. Note that the database described herein is only one example, and additional and/or different information may be stored therein. Moreover, various databases might be split or combined in accordance with any of the embodiments described herein.

Figure 26:
FIG. 26 is portion of a tabular industrial asset database in accordance with some embodiments.

Referring to FIG. 26, a table is shown that represents the cyber-physical system database 2600 that may be stored at the cyber-physical system protection platform 2500 according to some embodiments. The table may include, for example, entries identifying industrial assets or other systems to be protected. The table may also define fields 2602, 2604, 2606, 2608, 2610, 2612 for each of the entries. The fields 2602, 2604, 2606, 2608, 2610, 2612 may, according to some embodiments, specify: a cyber-physical system identifier 2602, a cyber-physical system description 2604, ensemble state-space models 2606, an overall features forecast 2608, an estimate 2610, and a status 2612. The cyber-physical system database 2600 may be created and updated, for example, when a new physical system is monitored or modeled, raw sensor data is received from monitoring odes, an attack is detected, etc.

The cyber-physical system identifier 2602 and description 2604 may define a particular industrial asset or system that will be protected. The ensemble state-space models 2606 might comprise links or unique alphanumeric codes identifying a set of models (created via GMM clustering) to represent feature evolution in the time-domain in accordance with any of the embodiments described herein. The overall features forecast 2608 might be generated based on outputs of the ensemble state-space models 2606 via dynamic ensemble averaging. The estimate 2610 might represent if (and/or when) a feature vector is predicted to cross an associated decision boundary for the cyber-physical system. The status 2612 might indicate, for example, whether the associated monitoring node is operating normally or is currently undergoing a cyber-attack.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on gas turbines, any of the embodiments described herein could be applied to other types of cyber-physical systems including power grids, dams, locomotives, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect a cyber-physical system, comprising:
    a plurality of monitoring nodes each generating a time-series of current monitoring node values that represent a current operation of the cyber-physical system; and
    a feature-based forecasting computer platform, coupled to the plurality of monitoring nodes, including:
        a computer processor, and
        a computer memory storing instructions that, when executed by the computer processor, cause the processor to:
            receive the time-series of current monitoring node values and generate a set of current feature vectors using feature discovery techniques,
            characterize the feature behavior for each monitoring node in the form of decision boundaries that separate normal and abnormal space based on operating data of the cyber-physical system,
            construct, via selections that use at least one of: (i) a soft cluster method and (ii) Gaussian Mixture Model ("GMM") clustering, a set of ensemble state-space models to represent feature evolution in the time-domain, wherein forecasted outputs from the set of ensemble state-space models, computed by applying at least one of: (i) an adaptive prediction method and (ii) an adaptive Kalman predictor to each ensemble model, comprise anticipated time evolution of features,
            obtain an overall features forecast through dynamic ensemble averaging,
            compare the overall features forecast to a threshold to generate an estimate associated with at least one feature vector crossing an associated decision boundary, and
            transmit an abnormality alert signal based on the estimate.

2. The system of claim 1, wherein the abnormality alert signal is associated with at least one of: (i) a failure in the cyber-physical system, and (ii) a cyber-attack.

3. The system of claim 1, wherein the set of current feature vectors include local feature vectors and global feature vectors.

4. The system of claim 1, wherein the generation of the set of current feature vectors uses dimensionality reduction in the feature space.

5. The system of claim 1, wherein the operating data is collected from at least one of: (i) operation of the cyber-physical system, and (ii) execution of a virtual model of the cyber-physical system.

6. The system of claim 1, wherein the construction of the set of ensemble state-space models uses model order reduction in the dynamic state-space.

7. The system of claim 1, wherein the dynamic ensemble averaging comprises projecting the evolution of feature vector to future times in a receding horizon fashion.

8. The system of claim 1, wherein the estimate includes at least one of: (i) an indication of whether at least one feature vector is predicted to cross an associated decision boundary, and (ii) an indication of when at least one feature vector is predicted to cross an associated decision boundary.

9. The system of claim 1, further comprising:
    a forecasting framework to generate a deterministic decision associated with anomaly detection and a probabilistic decision associated with situation awareness, including:
        an off-line training component to generate: (i) a short-term forecast model, (ii) a mid-term forecast model, and (iii) a long-term forecast model.

10. The system of claim 9, wherein the forecasting framework further includes:
    an on-line operation component using the short-term, mid-term, and long-term models to generate an early warning signal.

11. A method to protect a cyber-physical system associated with a plurality of monitoring nodes, each generating a series of current monitoring node values over time that represent a current operation of an industrial asset, comprising:
    receiving, by a feature-based forecasting computer platform from the plurality of monitoring nodes, the time-series of current monitoring node values that represent current operation of the cyber-physical system;
    generating a set of current feature vectors using feature discovery techniques;
    characterizing the feature behavior for each monitoring node in the form of decision boundaries that separate normal and abnormal space based on operating data of the cyber-physical system;
    constructing, via selections that use at least one of: (i) a soft cluster method and (ii) Gaussian Mixture Model ("GMM") clustering, a set of ensemble state-space models to represent feature evolution in the time-domain, wherein forecasted outputs from the set of ensemble state-space models, computed by applying at least one of: (i) an adaptive prediction method and (ii) an adaptive Kalman predictor to each ensemble model, comprise anticipated time evolution of features;
    obtaining an overall features forecast through dynamic ensemble averaging;
    comparing the overall features forecast to a threshold to generate an estimate associated with at least one feature vector crossing an associated decision boundary; and
    transmitting an abnormality alert signal based on the estimate.

12. The method of claim 11, wherein the abnormality alert signal is associated with at least one of: (i) a failure in the cyber-physical system, and (ii) a cyber-attack.

13. The method of claim 11, wherein the set of current feature vectors include local feature vectors and global feature vectors.

14. The method of claim 11, wherein the generation of the set of current feature vectors uses dimensionality reduction in the feature space.

15. A non-transitory, computer-readable medium storing program code, the program code executable by a computer processor to cause the processor to perform a method to protect a cyber-physical system, the method comprising:
   receiving, by a feature-based forecasting computer platform from a plurality of monitoring nodes, a time-series of current monitoring node values that represent a current operation of the cyber-physical system;
   generating a set of current feature vectors using feature discovery techniques;
   characterizing the feature behavior for each monitoring node in the form of decision boundaries that separate normal and abnormal space based on operating data of the cyber-physical system;
   constructing, via selections that use at least one of: (i) a soft cluster method and (ii) Gaussian Mixture Model ("GMM") clustering, a set of ensemble state-space models to represent feature evolution in the time-domain, wherein forecasted outputs from the set of ensemble state-space models, computed by applying at least one of: (i) an adaptive prediction method and (ii) an adaptive Kalman predictor to each ensemble model, comprise anticipated time evolution of features;
   obtaining an overall features forecast through dynamic ensemble averaging;
   comparing the overall features forecast to a threshold to generate an estimate associated with at least one feature vector crossing an associated decision boundary; and
   transmitting an abnormality alert signal based on the estimate.

16. The medium of claim 15, wherein the construction of the set of ensemble state-space models uses model order reduction in the dynamic state-space.

17. The medium of claim 15, wherein the dynamic ensemble averaging comprises projecting the evolution of feature vector to future times in a receding horizon fashion.

18. The medium of claim 15, wherein the estimate includes at least one of: (i) an indication of whether at least one feature vector is predicted to cross an associated decision boundary, and (ii) an indication of when at least one feature vector is predicted to cross an associated decision boundary.

* * * * *